United States Patent
Mizusawa

(10) Patent No.: US 10,530,432 B2
(45) Date of Patent: Jan. 7, 2020

(54) WIRELESS COMMUNICATION DEVICE, TERMINAL DEVICE, AND METHOD

(71) Applicant: SONY CORPORATION, Tokyo (JP)

(72) Inventor: Nishiki Mizusawa, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 15/565,518

(22) PCT Filed: Apr. 12, 2016

(86) PCT No.: PCT/JP2016/061767
§ 371 (c)(1),
(2) Date: Oct. 10, 2017

(87) PCT Pub. No.: WO2016/189990
PCT Pub. Date: Dec. 1, 2016

(65) Prior Publication Data
US 2018/0062711 A1     Mar. 1, 2018

(30) Foreign Application Priority Data
May 25, 2015 (JP) ................................ 2015-105519

(51) Int. Cl.
    *H04B 7/0426*     (2017.01)
    *H04B 7/0452*     (2017.01)
    (Continued)

(52) U.S. Cl.
    CPC ......... *H04B 7/0452* (2013.01); *H04B 7/0469* (2013.01); *H04B 7/0626* (2013.01);
    (Continued)

(58) Field of Classification Search
CPC combination set(s) only.
See application file for complete search history.

(56) References Cited

U.S. PATENT DOCUMENTS

| | | | |
|---|---|---|---|
| 2009/0023462 A1* | 1/2009 | Dent | .......................... G01S 1/42 455/456.5 |
| 2013/0089078 A1* | 4/2013 | Liu | ....................... H04L 1/1819 370/335 |

(Continued)

FOREIGN PATENT DOCUMENTS

| | | |
|---|---|---|
| EP | 2 869 478 A1 | 5/2015 |
| JP | 2010-537595 A | 12/2010 |

(Continued)

OTHER PUBLICATIONS

CMCC, "Feedback framework for diverse 3D-MIMO antenna configurations," 3GPP TSG-RAN WG1 #80, R1-150448, Athens, Greece, Feb. 2015, 3 pages.

(Continued)

*Primary Examiner* — Khaled M Kassim
*Assistant Examiner* — Syed Ali
(74) *Attorney, Agent, or Firm* — Xsensus LLP

(57) ABSTRACT

A wireless communication device including a control unit configured to generate information for a terminal device based on information acquired from the terminal device. The control unit outputs a reference signal on a first beam generated with at least two or more different first weighting matrices, generates a second weighting matrix specific to a terminal device in accordance with information transmitted from the terminal device in accordance with the reference signal, and outputs data for the terminal device on a second beam with the first weighting matrices and the second weighting matrix. The wireless communication device can supply an appropriate beam to a terminal device while preventing a problem with overhead or increase in the cost of a wireless device, which are caused by an increasing number of antenna elements when FD-MIMO is used.

12 Claims, 33 Drawing Sheets

(51) Int. Cl.
*H04B 7/0456* (2017.01)
*H04B 7/06* (2006.01)
*H04W 72/04* (2009.01)
*H04W 16/28* (2009.01)
*H04W 24/10* (2009.01)
*H04B 7/0417* (2017.01)

(52) U.S. Cl.
CPC ........ *H04B 7/0695* (2013.01); *H04W 72/042* (2013.01); *H04W 72/046* (2013.01); *H04B 7/0417* (2013.01); *H04W 16/28* (2013.01); *H04W 24/10* (2013.01)

(56) References Cited

U.S. PATENT DOCUMENTS

| | | | | |
|---|---|---|---|---|
| 2013/0301542 | A1* | 11/2013 | Krishnamurthy | H04W 52/50 370/329 |
| 2014/0211731 | A1 | 7/2014 | Inoue et al. | |
| 2015/0124688 | A1 | 5/2015 | Xu et al. | |
| 2015/0288499 | A1* | 10/2015 | Nam | H04L 1/0026 370/329 |
| 2016/0065278 | A1* | 3/2016 | Wang | H04B 7/0456 375/267 |
| 2016/0142115 | A1* | 5/2016 | Onggosanusi | H04B 7/0456 370/252 |
| 2016/0277954 | A1* | 9/2016 | Frenne | H04W 72/0413 |
| 2016/0294454 | A1* | 10/2016 | Onggosanusi | H04B 7/0456 |
| 2016/0301505 | A1* | 10/2016 | Furuskog | H04W 72/00 |
| 2017/0273059 | A1* | 9/2017 | You | H04L 25/03 |
| 2017/0331670 | A1* | 11/2017 | Parkvall | H04W 52/0274 |
| 2018/0083681 | A1* | 3/2018 | Faxer | H04B 7/0413 |

FOREIGN PATENT DOCUMENTS

| | | |
|---|---|---|
| WO | 2016/021012 A1 | 2/2016 |
| WO | 2016/047505 A1 | 3/2016 |

OTHER PUBLICATIONS

Samsung, "Presentation of Specification/Report to TSG: TR 36.897 v 1.0.1 on Study on Elevation Beamforming/Full-Dimension (FD) MIMO for LTE," 3GPP TSG RAN Meeting #68, RP-150735, Malmo, Sweden, Jun. 2015, 59 pages.

NTT Docomo, "General Views on Precoding Schemes for Elevation BF and FD-MIMO," 3GPP TSG RAN WG1 Meeting #81, R1-153153, Fukuoka, Japan, May 2015, pp. 1-9.

International Search Report dated Jul. 12, 2016 in PCT/JP2016/061767 filed Apr. 12, 2016.

European Communication pursuant to Rule 164(1) EPC, dated Dec. 14, 2018, issued in corresponding European Application No. 16799698.

* cited by examiner

FIG. 3

| Antenna Port | 3GPP Release | Reference Signals | Application |
|---|---|---|---|
| 0 to 3 | 8 | Cell specific Reference Signals | Signal stream transmission, transmit diversity, MIMO |
| 4 | 8 | MBSFN Reference Signals | Multimedia Broadcast Multicast Services (MBMS) |
| 5 | 8 | UE specific Reference Signals | Beamforming without MIMO |
| 6 | 9 | Positioning Reference Signals | Location based services |
| 7 to 8 | 9 | UE specific Reference Signals | Beamforming with MIMO; multi-user MIMO |
| 9 to 14 | 10 | UE specific Reference Signals | Beamforming with MIMO; multi-user MIMO |
| 15 to 22 | 10 | CSI Reference Signals | Channel State Information (CSI) reporting |

WIRELESS COMMUNICATION DEVICE, TERMINAL DEVICE, AND METHOD

TECHNICAL FIELD

The present disclosure relates to a wireless communication device, a terminal device, and a method.

BACKGROUND ART

The improvement of wireless access performance is urgently needed due to a recent sharp increase in data traffic. It is considered to overlay and dispose macrocells, which use relatively low frequencies in the ultra-high frequency (UHF) band, and small cells, which use relatively high frequencies, in order to build a high-speed and large-capacity wireless access network. Full-dimension (FD) multi-input multi-output (MIMO), which compensates for high propagation losses, is considered for small cells, which use high frequency bands. FD-MIMO is a technique of two-dimensionally disposing base station antennas in the horizontal and vertical directions for MIMO communication.

Patent Literature 1 discloses a technique of allowing a terminal to select a desired weighting factor from weighting factor candidates (codebook) and feed back the desired weighting factor to a base station to flexibly decide the weighting factor of a system that uses multiple antennas.

CITATION LIST

Patent Literature

Patent Literature 1: JP 2010-537595T

DISCLOSURE OF INVENTION

Technical Problem

If an antenna port is assigned and a reference signal is transmitted to each antenna element in FD-MIMO, which form sharp beams and transmit signals with an array antenna including a large number of antenna elements, it is necessary to secure a large amount of orthogonal resources and the problem with overhead arises.

The present disclosure then proposes a novel and improved wireless communication device, terminal device, and method that can supply an appropriate beam to a terminal device and receive a beam with a terminal device while preventing the problem with overhead or increase in the cost of a wireless device, which are caused by an increasing number of antenna elements when FD-MIMO is used.

Solution to Problem

According to the present disclosure, there is provided a wireless communication device including: a control unit configured to output a reference signal on a first beam generated with at least two or more different first weighting matrices, generate a second weighting matrix specific to a terminal device in accordance with information transmitted from the terminal device in accordance with the reference signal, and output data for the terminal device on a second beam with the first weighting matrices and the second weighting matrix.

In addition, according to the present disclosure, there is provided a wireless communication device including: a control unit configured to output a reference signal on a beam generated with at least two or more different weighting matrices, decide timing of outputting data for a terminal device on the beam in accordance with information transmitted from the terminal device in accordance with the reference signal, and output the data for the terminal device at the decided timing.

In addition, according to the present disclosure, there is provided a terminal device including: a control unit configured to measure reference signals transmitted on beams from a wireless communication device, and generate a channel state report on the basis of an instruction from the wireless communication device, the channel state report reporting a channel state of each beam to the wireless communication device, the instruction being included in the beam.

In addition, according to the present disclosure, there is provided a method including: outputting a reference signal on a first beam generated with at least two or more different first weighting matrices; and generating a second weighting matrix specific to a terminal device on the basis of information acquired from the terminal device in accordance with the reference signal, and outputting data for the terminal device on a second beam generated with the first weighting matrices and the second weighting matrix.

In addition, according to the present disclosure, there is provided a method including: outputting a reference signal on a beam generated with at least two or more different weighting matrices; and deciding timing of outputting data for a terminal device on the beam on the basis of information acquired from the terminal device in accordance with the reference signal, and outputting the data for the terminal device at the decided timing.

In addition, according to the present disclosure, there is provided a method including: measuring reference signals transmitted from a wireless communication device on beams corresponding to a terminal device; generating a channel state report on the basis of an instruction from the wireless communication device, the channel state report reporting a channel state of each beam; and receiving a beam generated by the wireless communication device on the basis of the channel state report.

Advantageous Effects of Invention

As described above, according to the present disclosure, it is possible to provide a novel and improved wireless communication device, terminal device, and method that can supply an appropriate beam to a terminal while preventing the problem with overhead or increase in the cost of a wireless device, which are caused by an increasing number of antenna elements when FD-MIMO is used.

Note that the effects described above are not necessarily limitative. With or in the place of the above effects, there may be achieved any one of the effects described in this specification or other effects that may be grasped from this specification.

BRIEF DESCRIPTION OF DRAWINGS

FIG. 3 is an explanatory diagram illustrating a definition of an antenna port with which a reference signal is transmitted for each application.

MODE(S) FOR CARRYING OUT THE INVENTION

Figure 1:
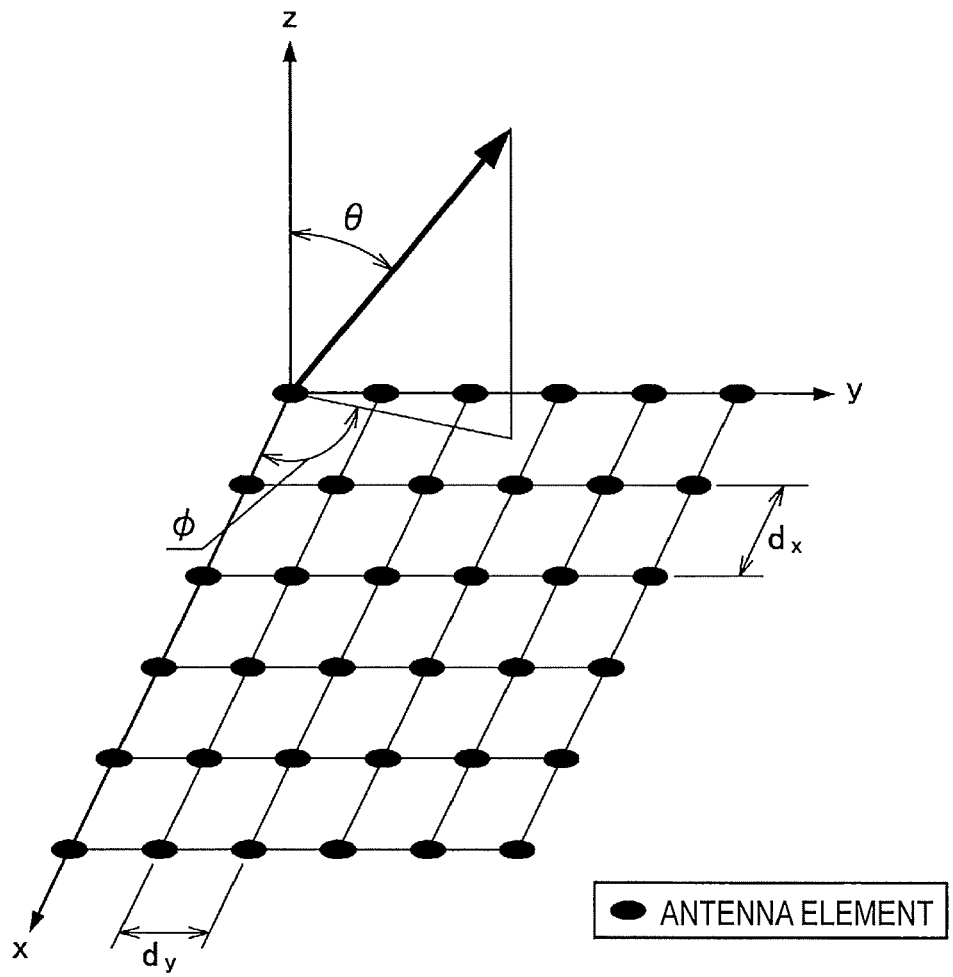
FIG. 1 is an explanatory diagram illustrating an example of an array antenna including antenna elements disposed in a shape of a lattice.

Hereinafter, (a) preferred embodiment(s) of the present disclosure will be described in detail with reference to the appended drawings. In this specification and the appended drawings, constituent elements that have substantially the same function and structure are denoted with the same reference numerals, and repeated explanation of these constituent elements is omitted.

Note that description will be provided in the following order.

1. Embodiment of present disclosure
1.1. Background
1.2. Configuration Examples
1.2.1. Configuration example of communication system
1.2.2. Configuration example of terminal device
1.2.3. Configuration example of base station
1.2.4. Configuration example of control entity
1.3. Operation examples
2. Application examples
3. Conclusion 1. Embodiment of Present Disclosure 1.1. Background First, a background of an embodiment of the present disclosure will be described before the embodiment of the present disclosure is described in detail.

Recent wireless communication environments have been confronted with a sharp increase in data traffic. The improvement of wireless access performance is then urgently needed due to a sharp increase in data traffic. It is considered to overlay and dispose macrocells, which use relatively low frequencies in the ultra-high frequency (UHF) band, and small cells, which use relatively high frequencies, in order to build a high-speed and large-capacity wireless access network. Full-dimension (FD) multi-input multi-output (MIMO), which compensates for high propagation losses, is considered for small cells, which use high frequency bands.

If an antenna port is assigned and a reference signal is transmitted to each antenna element in FD-MIMO, which form sharp beams and transmit signals with an array antenna including a large number of antenna elements, it is necessary to secure a large amount of orthogonal resources and the problem with overhead arises.

The weighting factor of each antenna element for the conventional beamforming is expressed as a complex number that represents a phase. FIG. 1 is an explanatory diagram illustrating an example of an array antenna including antenna elements disposed in the shape of a lattice. FIG. 1 is an explanatory diagram for describing the relationship between the position of each antenna element of the array antenna and the three-dimensional direction of a beam.

FIG. 1 illustrates antenna elements disposed in the shape of a lattice. Further, FIG. 1 also illustrates two axes x and y that are orthogonal to each other on a plane on which the antenna elements are disposed, and one axis z that is orthogonal to the plane. Here, the direction of a beam to be formed is represented, for example, with an angle phi (Greek letter) and an angle theta (Greek letter). The angle phi (Greek letter) is the angle formed between an xy-plane component of the beam direction and the x axis. Further, the angle theta (Greek letter) is the angle formed between the beam direction and the z axis. In this case, for example, a weighting factor $V_{m,n}$ of the antenna element that is the m-th to be disposed in an x-axis direction and the n-th to be disposed in a y-axis direction can be expressed like the following equation 1.

[Math. 1]

$$V_{m,n}(\theta,\varphi,f) = \exp(j2\pi f/c[(m-1)d_x \sin(\theta)\cos(\varphi) + (n-1)d_y \sin(\theta)\sin(\varphi)]) \quad \text{(Equation 1)}$$

In the equation above, f represents frequency, and c represents the speed of light. Further, j is the imaginary unit of the complex number. Further, $d_x$ represents the interval between antenna elements in the x-axis direction, and $d_y$ represents the interval between antenna elements in the y-axis direction. Additionally, the coordinates (x, y) of an antenna element is expressed like the following equation 2.

[Math. 2]

$$x=(m-1)d_x, y=(n-1)d_y \quad \text{(Equation 2)}$$

If a desired three-dimensional direction is decided, it is possible to obtain the weighting factor $V_{m,n}$ of each antenna element from the above-described equations on the basis of the direction and the frequency f. The obtained weighting factor is used, for example, for complex multiplication by a transmission signal.

Figure 2:
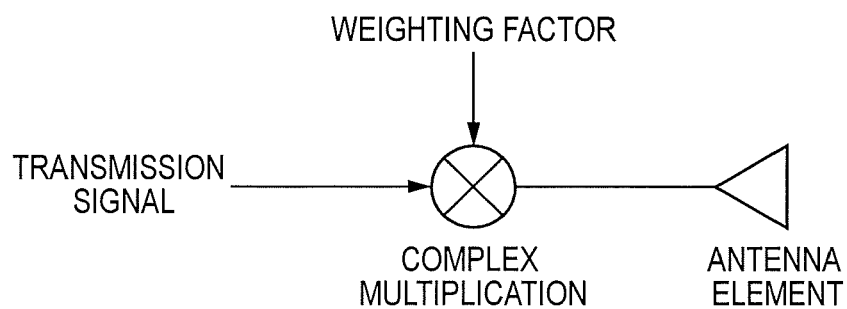
FIG. 2 is an explanatory diagram illustrating an example of a technique of using a weighting factor for beamforming.

FIG. 2 is an explanatory diagram illustrating an example of a technique of using a weighting factor for beamforming. FIG. 2 illustrates that a transmission signal corresponding to each antenna element is subjected to complex multiplication by the weighting factor of each antenna element. The transmission signal subjected to the complex multiplication by the weighting factor is transmitted from the antenna element. For example, the complex multiplication by a weighting factor is performed on an analog signal. Additionally, the complex multiplication by a weighting factor may also be performed on a digital signal.

Each antenna element is omnidirectional or all the antenna elements can be considered to have the same directivity, so that propagation loss is constant between each antenna element and a terminal. A weighting factor for conventional beamforming can be thus expressed with only a phase factor like the equation 1.

Next, an example of beamforming in the Long Term Evolution (LTE) platform will be described.

Transmission

Mode (TM) 7 supports single layer beamforming (BF). A base station (eNodeB) uses an antenna port 5 in TM 7, and places a demodulation-reference signal (DM-RS) on a beam. A UE (terminal) reports only a channel quality indicator (CQI) (channel quality information) to the base station, but reports no rank indicator (RI) or predetermined matrix indicator (PMI). The antenna port refers to a logical antenna with which downlink data or a reference signal is transmitted.

TM 8 supports dual layer beamforming (BF). Dual layer beamforming allows two UEs to concurrently receive dual layer BF or allows four UEs to receive single layer BF. That is, it is possible in dual layer beamforming to use four layers in total. A base station uses, in TM 8, antenna ports 7 and 8 concurrently, or any of the antenna ports 7 and 8 to place DM-RSs on beams. A UE reports a CQI to a base station by default. Further, a base station can request a UE to report an RI and a PMI. Additionally, the antenna ports 7 and 8 represent the entire antenna array that generates beams, but do not represent individual antenna elements included in the antenna array.

TM 8 (DCI format 2C) supports 8×8 MIMO for single-users, and supports for multi-users whether two UEs concurrently receive dual layer BF or four UEs receive single layer BF. In a case of one UE, a base station uses antenna ports 7 to 14 to place DM-RSs on beams. A UE reports a CQI to a base station by default, and the base station can further request the UE to report an RI and a PMI.

TM 9 has the following capability.

2×2,

4×4, 8×8 MIMO w/ beamforming

Open

/ close loop mode

2 stage codebook design for generating PMI at the UE

Non-codebook based precoding at the eNodeB

Up to 8 CSI-RS on antenna port 15-22

Up to 8 DM-RS on antenna port 7-14

Open

In a case of a loop mode, a UE generates a CQI from a CRS and reports the CQI to a base station, but reports no PMI or RI. The base station uses an uplink SRS. In a case of a closed loop mode, a UE reports a CQI, an RI, and a PMI to a base station. The CQI is generated from a CSI-RS. The base station notifies the UE whether to report the RI and the PMI through RRC signaling.

The first stage of a 2-stage PMI corresponds to a channel characteristic of a wideband long term, and the second stage corresponds to a channel characteristic of a frequency selective short term. Any of 16 groups of beams is specified in the first stage, and four beams in one group are specified in the second stage. A UE is notified of antenna ports to be used in DCI format 2C.

As described above, the antenna port refers to a logical antenna with which downlink data or a reference signal is transmitted. It depends on implementation how an actual physical antenna element conforms to this antenna port. If a UE knows the relationship between an antenna port and a reference signal, the UE can perform necessary measurement. It is not necessary to know the assignment of physical antenna elements of a base station or the number of physical antenna elements.

FIG. 3 is an explanatory diagram illustrating a definition of an antenna port with which a reference signal is transmitted for each application. In a case of MIMO or beamforming, antenna ports corresponding to layers in number are used. For example, the number of antenna ports is regarded as one irrespective of the number of physical antenna elements that generate beams in one-layer beamforming. UE data (one codeword) and a DM-RS are multiplied by the same weighting matrix, and transmitted with the same antenna port including antenna elements.

Next, a reference signal of LTE will be described. LTE prepares reference signals such as a CRS, a CSI-RS, and a DM-RS.

The DM-RS is used for correctly decoding downlink data. In a case of beamformed downlink data, a DM-RS is also multiplied by an antenna weighting factor similarly to downlink data, and beamformed. A DM-RS used for the antenna port 5 distinguishes UEs with physical layer cell identity (PCI) and radio network temporary identifiers (RNTIs), and is transmitted on a specific resource element decided in accordance with the PCI in a resource block assigned to a UE. It is possible to support multi-user single layer beamforming for UEs having different beam directions. RNTIs are used to generate the sequences of DM-RSs, and the DM-RS sequences can be distinguished for each UE. The DM-RS sequences are not, however, orthogonal, causing interference.

DM-RSs that are orthogonal due to orthogonal covering codes (OCCs) are transmitted with the antenna ports 7 and 8 on predefined resource elements common to the antenna ports 7 and 8.

DM-RSs of the antenna ports 7, 8, 11, and 13 are transmitted with common resource elements. DM-RSs of the antenna ports 9, 10, 12, and 14 are transmitted with other common resource elements.

A CRS is used for cell selection. A CSI-RS is used for measuring the quality of a channel such as deciding a modulation scheme. The CSI-RS is used for channel estimation and link adaptation instead of the CRS, which fluctuates due to PDSCH scheduling or interference from another cell.

Antenna ports 15 to 22 are used in accordance with the number (1, 2, 4, or 8) of reference signals included in a CSI-RS.

CSI reference signal configuration of which a UE is notified through RRC signaling notifies the UE of an antenna port for transmitting a CSI-RS, the position of a resource element at which the CSI-RS is inserted, information on a sub frame into which the CST-RS is inserted, information of the power ratio between the CSI-RS and a PDSCH, and the like.

Additionally, it is necessary to measure the original state of a channel, so that CRSs and CSI-RSs have not been conventionally beamformed.

Reference signals of LTE and the standards of antenna ports are described in 3GPP (see TS36.211 6.10).

Figure 4:
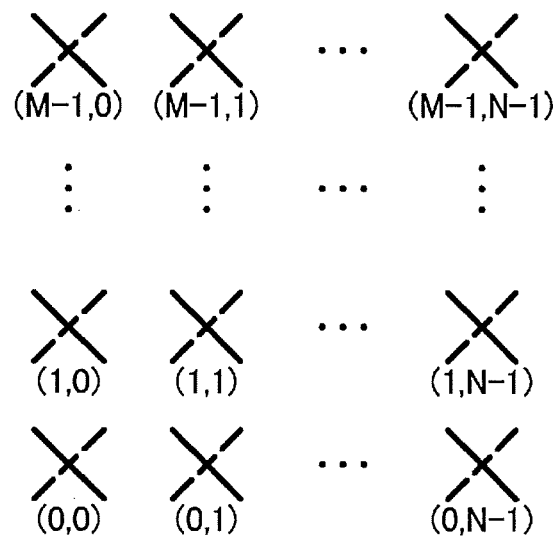
FIG. 4 is an explanatory diagram illustrating an example of an antenna array model.

Next, the conventional beamforming will be described. The conventional configuration requires transmission and reception devices and power amplifiers corresponding to antenna elements in number for beamforming. FIG. 4 is an explanatory diagram illustrating an example of an antenna array model. (M, N, P) represent an antenna array model in which antenna elements are two-dimensionally disposed. M represents the number of antenna elements in the row direction, N represents the number of antenna elements in the column direction, and P represents the number of antennas in the polarization direction. In a case of a configuration of +45/−45 deg, P is 2.

FD-MIMO includes quite a large number of antenna elements in an antenna array. It is then considered to simplify a baseband (BB) circuit and decrease the cost of a wireless device by installing a fixed analog phase shifter between a transceiver unit (TXRU) that supplies signals to antenna elements and each antenna element (see 3GPP TR36.897 v0.1.1). This limits the size of a weighting matrix for adjusting a sharp beam for each user while maintaining the sharp beam, and requires lighter processing than adjusting the weighting factors of all the antenna elements.

Figure 5:
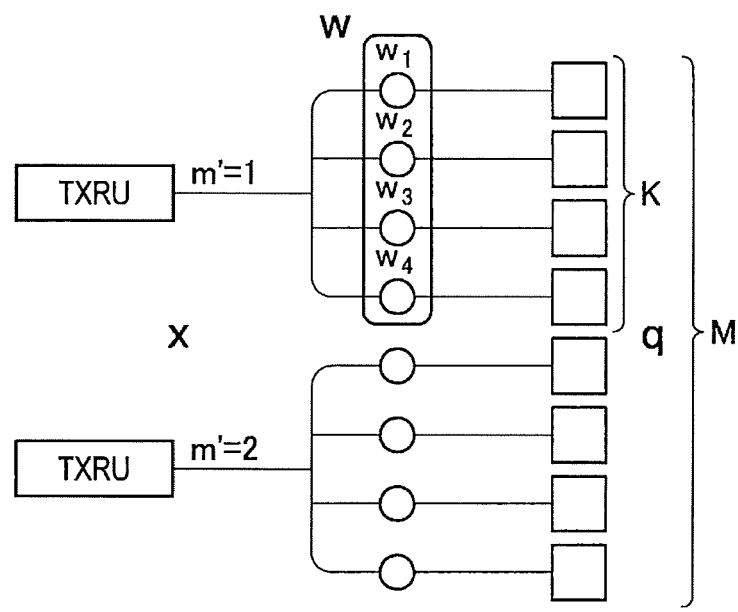
FIG. 5 is an explanatory diagram illustrating an option 1 of a TXRU virtualization model.
Figure 6:
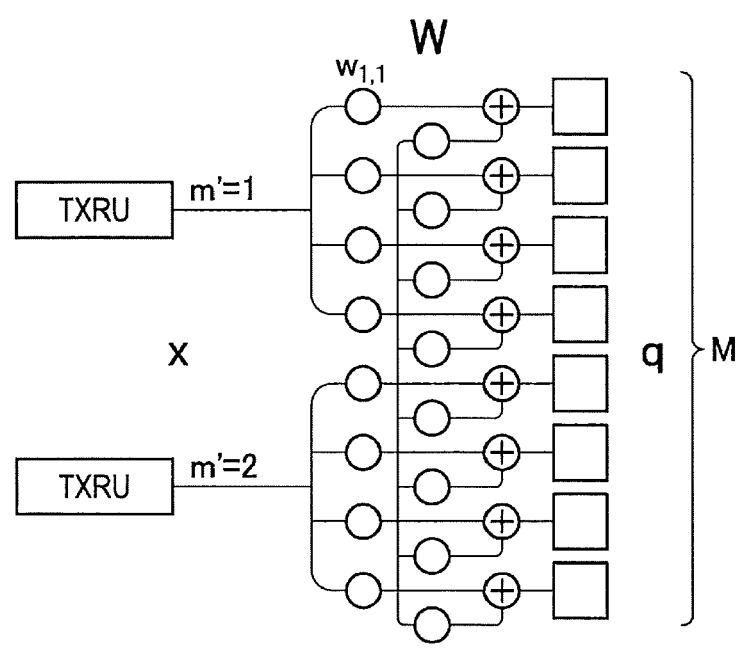
FIG. 6 is an explanatory diagram illustrating an option 2 of the TXRU virtualization model.

A TXRU virtualization model proposed in 3GPP TR36.897 v0.1.1 will be described. Two options are assumed: an option (option 1) in which M antenna elements in the vertical direction are divided into sub arrays and connected to TXRUs; and an option (option 2) in which M antenna elements are all connected to respective TXRUs. FIG. 5 is an explanatory diagram illustrating the option 1 of the TXRU virtualization model. Further, FIG. 6 is an explanatory diagram illustrating the option 2 of the TXRU virtualization model.

If the number of TXRUs in the vertical direction is $M_{TXRU}$, the total number of TXRUs is $M_{TXRU} \times N \times P$. In the option 1, w between a TXRU and an antenna element is expressed in the following equation.

$$w_k = \frac{1}{\sqrt{K}} \exp\left(-j\frac{2\pi}{\lambda}(k-1)d_V \cos\theta_{etilt}\right) \quad \text{[Math. 3]}$$

for $k = 1, \ldots, K$

Further, in the option 2, w between a TXRU and an antenna element is expressed in the following equation.

$$w_{m,m'} = \frac{1}{\sqrt{M}} \exp\left(-j\frac{2\pi}{\lambda}(m-1)d_V \cos\theta_{etilt,m'}\right) \quad \text{[Math. 4]}$$

Figure 7:
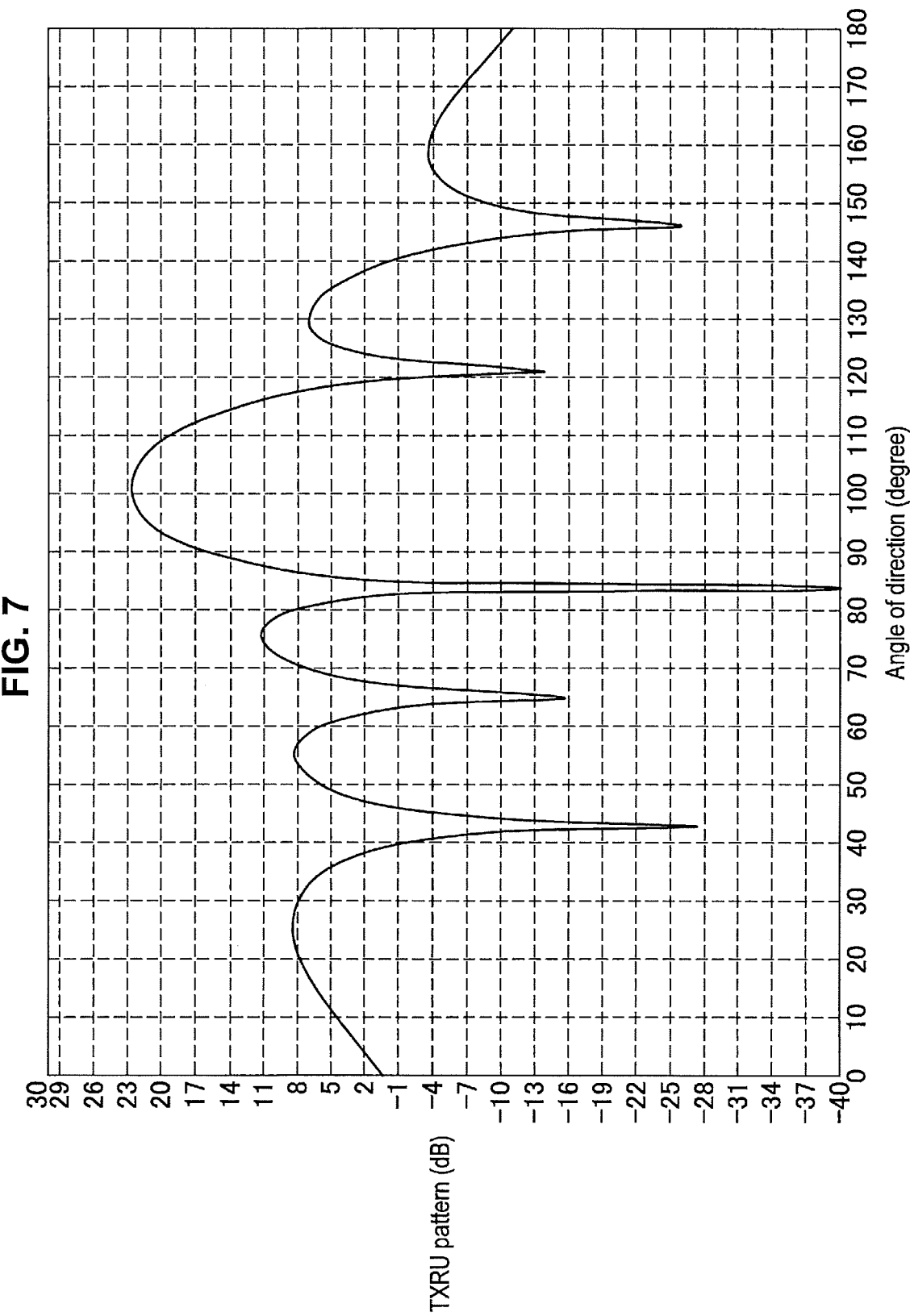
FIG. 7 is an explanatory diagram illustrating an example of a beam pattern emitted from a TXRU of the option 1.
Figure 8:
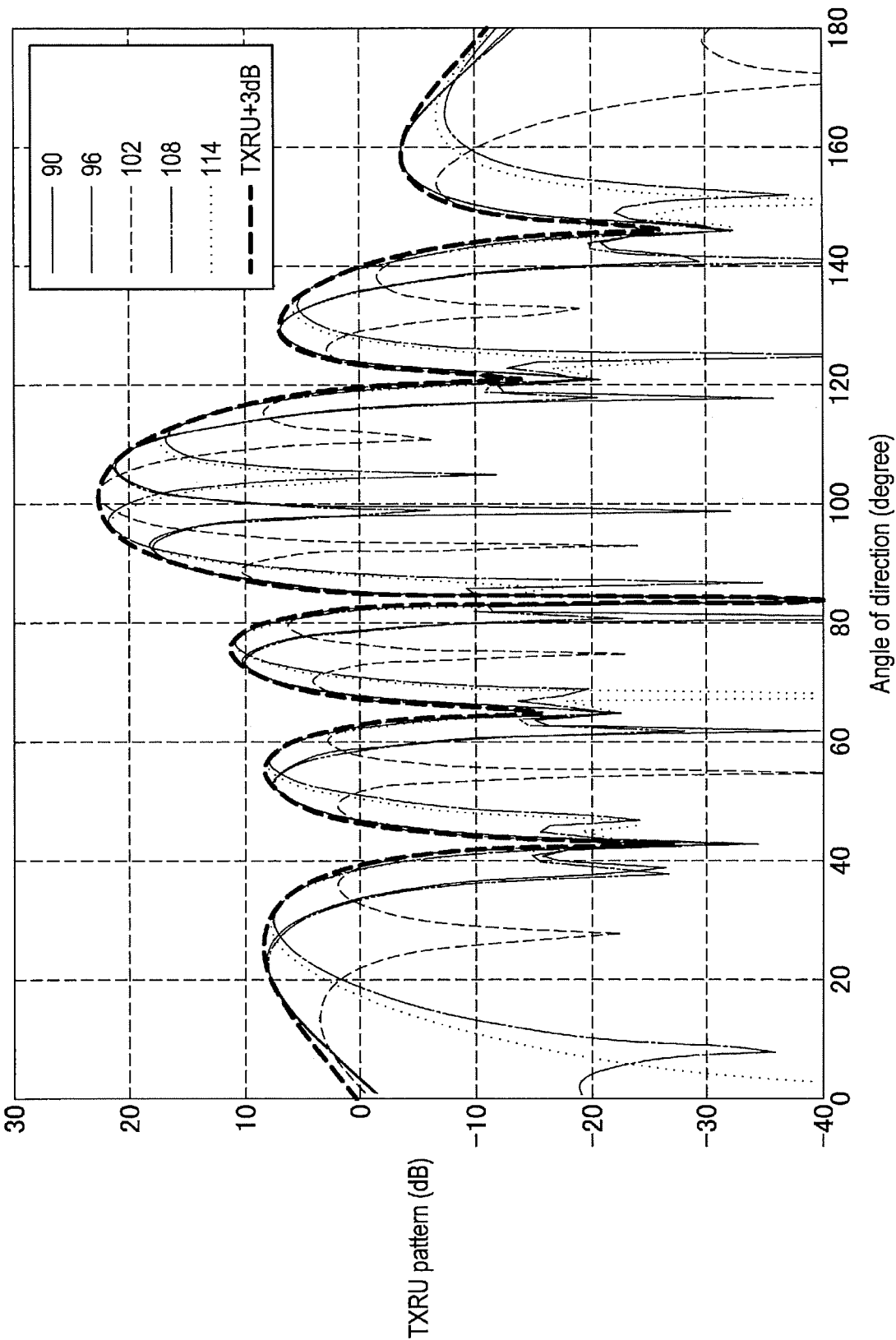
FIG. 8 is an explanatory diagram illustrating an example of a PDSCH beam in the option 1.

FIG. 7 is an explanatory diagram illustrating an example of a beam pattern emitted from a TXRU of the option 1, for example, in a case of an antenna array including 64 elements as M=8 and N=8, and $M_{TXRU}$=2. FIG. 7 illustrates that all the TXRUs use the same w, and beams have the same directivity. Placing a pre-weight for inserting an appropriate weight into each TXRU sharpens a PDSCH beam as illustrated in FIG. 8. For example, a base station can estimate the angle of the direction of a terminal from a sounding reference signal (SRS) transmitted by the terminal, and adjust the pre-weight placed on the stage before a TXRU in a manner that a PDSCH beam has the optimum direction.

There is, however, the problem that pointing a PDSCH beam in a direction deviant from the beam direction of a TXRU not only decreases a beam gain, but also leads to greater interference in another direction. FIG. 8 is an explanatory diagram illustrating an example of a PDSCH beam in the option 1. As illustrated in FIG. 8, for example, pointing a PDSCH beam in a direction deviant from the beam direction of a TXRU like a PDSCH beam having a theta (Greek letter) of 114 [deg] not only decreases a beam gain, but also leads to greater interference in another direction.

If the TXRU virtualization model is used in this way, it is possible to provide a PDSCH to a terminal on a sharp beam by using a fixed TXRU weighting matrix and a pre-weight whose processing is light. TXRU beams, however, have the same directivity, so that there is the problem that the directions of PDSCH beams are limited.

Meanwhile, forming sharp beams as PDSCH beams with TXRU beams having different directions requires new reference signals and a feedback mechanism for generating pre-weights for inserting appropriate weights into the stages before the TXRUs.

Patent Literature 1 above discloses a technique of allowing a terminal to select a desired weighting factor from weighting factor candidates (codebook) and feed back the desired weighting factor to a base station to flexibly decide the weighting factor of a multi-antenna system. FD-MIMO, however, requires a large number of antenna elements in an array antenna, so that a codebook also increases in size. This imposes heavy processing load in selecting a desirable weighting factor.

In summary, it is desirable to clarify the following points to supply an appropriate beam to a terminal when FD-MIMO is used.
(1) FD-MIMO requires quite a large number of antenna elements in an antenna array, so that the scale of a baseband circuit increases and a wireless device costs more.
(2) FD-MIMO requires quite a large number of antenna elements in an antenna array, so that sending s reference signals for channel estimation increases overhead.
(3) In a case where the configuration of the TXRU virtualization model is used, it is difficult to provide a sharp beam to a terminal outside TXRU coverage.
(4) If the transmission period of reference signals for channel estimation is prolonged to decrease overhead, a beam is incompatible with a terminal moving at high speed.

In view of the above-described circumstances, the present discloser has actively studied a technique that can supply an appropriate beam to a terminal while preventing the problem with overhead or increase in the cost of a wireless device, which are caused by an increasing number of antenna elements when FD-MIMO is used. As a result, as described below, the present discloser has devised a technique that can supply an appropriate beam to a terminal while preventing the problem with overhead or increase in the cost of a wireless device, which are caused by an increasing number of antenna elements when FD-MIMO is used.

The background of the embodiments of the present disclosure has been described above. Next, a configuration example of an embodiment of the present disclosure will be described.

1.2. Example of Configuration (1.2.1. Configuration Example of Communication System)

Figure 9:
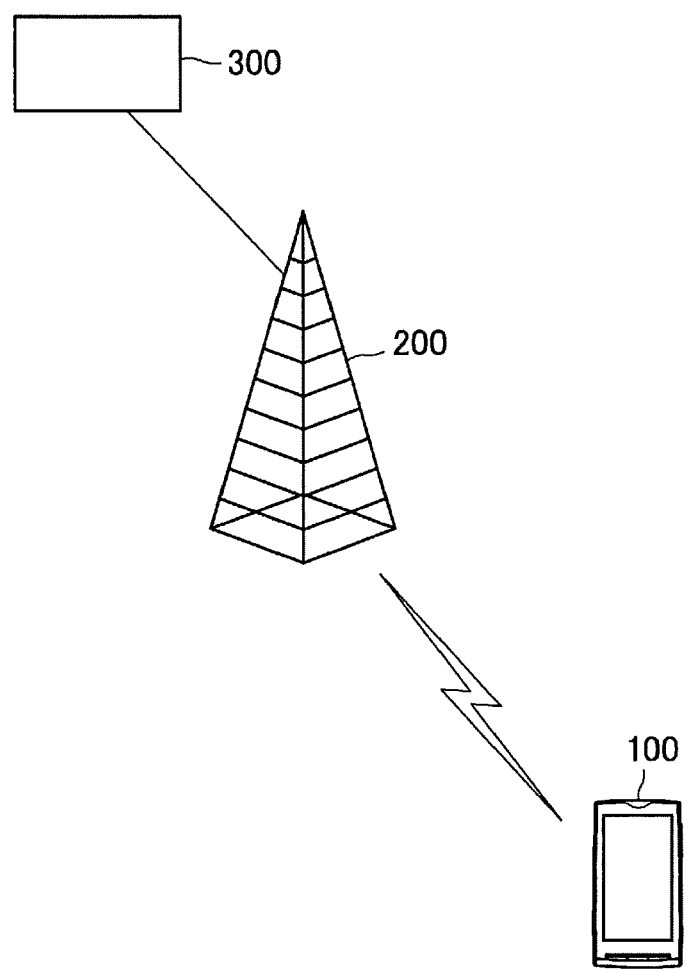
FIG. 9 is an explanatory diagram illustrating an example of a schematic configuration of a communication system 1 according to an embodiment of the present disclosure.

First, the schematic configuration of a communication system 1 according to an embodiment of the present disclosure will be described. FIG. 9 is an explanatory diagram illustrating an example of the schematic configuration of the communication system 1 according to an embodiment of the present disclosure. FIG. 9 illustrates that the communication system 1 includes a terminal device 100, a base station 200, and a control entity 300. The communication system 1 is compliant with, for example, LTE, LTE-Advanced, or a communication scheme equivalent thereto.

The terminal device 100 performs wireless communication with the base station 200. Further, the terminal device 100 performs measurements for cells (such as a serving cell and an adjacent cell). Further, the terminal device 100 reports a measurement (i.e., reports a measurement result) to the base station 200.

The base station 200 performs wireless communication with one or more terminal devices including the terminal device 100. Further, the base station 200 decides the handover of a terminal device on the basis of a measurement result reported by the terminal device. The base station 200 may be a base station in a macro cell (i.e., macro base station) or a base station in a small cell (i.e., small base station).

The control entity 300 performs control according to each embodiment of the present disclosure. For example, the control entity 300 is an existing or a new core network node. Alternatively, the control entity 300 may be a base station. As an example, in a case where the base station 200 is a small base station, the control entity 300 may be a macro base station.

Additionally, for example, the "on-state" of a cell (such as a small cell) means the state in which a base station in the cell transmits and receives signals (data signals and control signals) in the cell in an embodiment of the present disclosure. In contrast, for example, the "off-state" of a cell (such as a small cell) means the state in which a base station in the cell transmits and receives no signals but some control signals (such as DRSs) in the cell. Alternatively, the "off-state" of a cell may mean the state in which a base station in the cell does not transmit or receive any signals.

The example of the schematic configuration of the communication system 1 according to the embodiment of the present disclosure has been described above using FIG. 9. Next, a configuration example of the terminal device 100 according to the embodiment of the present disclosure will be described.

(1.2.2. Configuration Example of Terminal Device)

Figure 10:
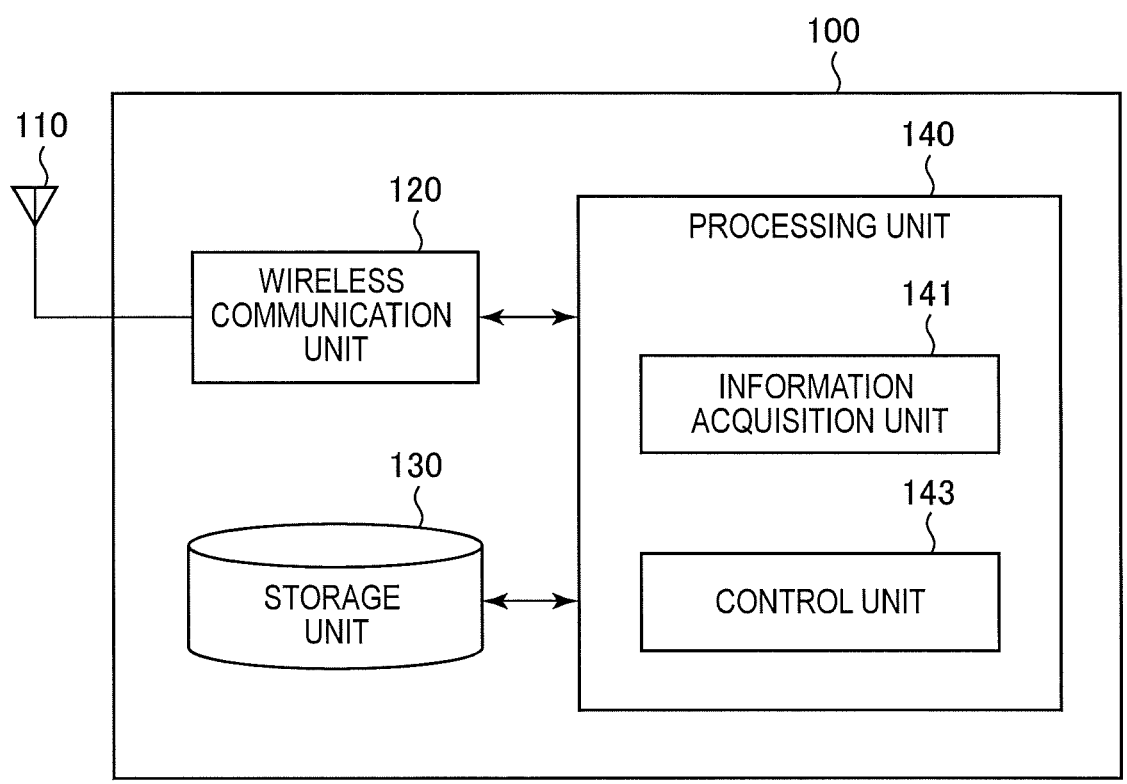
FIG. 10 is a block diagram illustrating an example of a configuration of a terminal device 100 according to the embodiment of the present disclosure.

FIG. 10 is a block diagram illustrating an example of a configuration of the terminal device 100 according to the embodiment of the present disclosure. Referring to FIG. 10, the terminal device 100 includes an antenna unit 110, a wireless communication unit 120, a storage unit 130, and a processing unit 140.

(Antenna Unit 110)

The antenna unit 110 emits a signal output by the wireless communication unit 120 to a space as a radio wave. In addition, the antenna unit 110 converts a radio wave in a space into a signal and outputs the signal to the wireless communication unit 120.

(Wireless Communication Unit 120)

The wireless communication unit 120 receives a signal. For example, the wireless communication unit 120 receives a downlink signal from a base station and transmits an uplink signal to a base station.

(Storage Unit 130)

The storage unit 130 temporarily or permanently stores programs and data for operations of the terminal device 100.

(Processing Unit 140)

The processing unit 140 provides various functions of the terminal device 100. The processing unit 140 includes an information acquisition unit 141 and the control unit 143. Note that the processing unit 140 can further include other constituent elements in addition to these constituent elements. That is, the processing unit 140 can perform other operations in addition to operations of the constituent elements.

(Information Acquisition Unit 141)

The information acquisition unit 141 acquires various kinds of information from signals acquired from radio waves received by the antenna unit 110. The information acquisition unit 141 acquires reference signals transmitted from the base station 200 or data placed on data channels in the present embodiment. The information acquisition unit 141 acquires, for example, cell specific beam configuration information. The cell specific beam configuration information may be an antenna port of a cell specific beam included in a PDSCH beam, or information on a terminal specific weighting matrix generated by the base station 200.

(Control Unit 143)

The control unit 143 controls the operation of the terminal device 100. For example, the control unit 143 measures the reference signals transmitted on beams for all the terminal devices from the base station 200, and generates a channel state report on the basis of an instruction from the base station 200 in the present embodiment. The channel state report reports the state of the channel of each beam. The control unit 143 may also include information of the reception strength of each reference signal for channel estimation when generating a channel state report.

Further, the control unit 143 may receive a PDSCH beam and cell specific beam configuration information from the base station 200, and use the cell specific beam configuration information to separate a PDSCH for each cell specific beam received by the antenna unit 110.

The functional configuration example of the terminal device 100 according to an embodiment of the present disclosure has been described above. Next, a functional configuration example of the base station 200 according to an embodiment of the present disclosure will be described.

(1.2.3. Configuration Example of Base Station)

Figure 11:
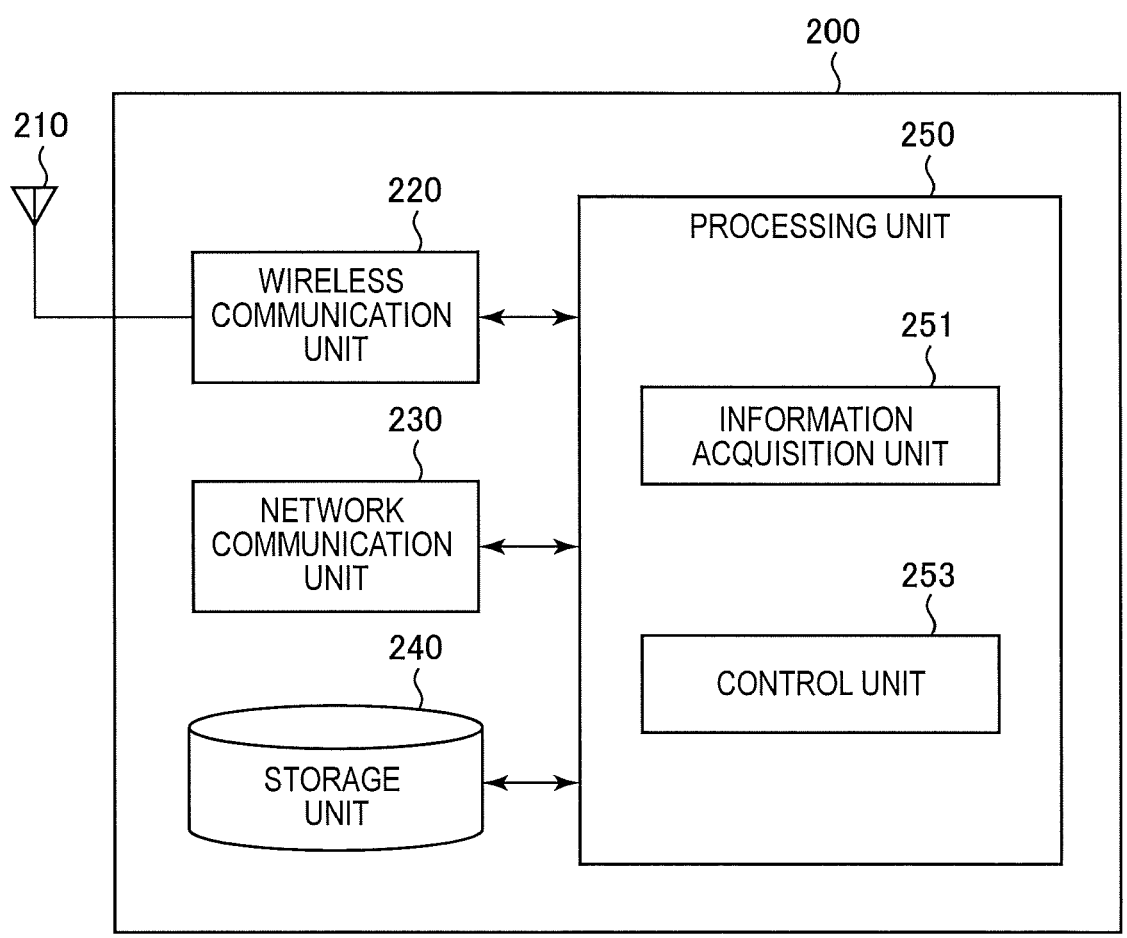
FIG. 11 is a block diagram illustrating a functional configuration example of a base station 200 according to an embodiment of the present disclosure.

FIG. 11 is a block diagram illustrating a functional configuration example of the base station 200 according to an embodiment of the present disclosure. As illustrated in FIG. 11, the base station 200 according to the embodiment of the present disclosure includes an antenna unit 210, a wireless communication unit 220, a network communication unit 230, a storage unit 240, and a processing unit 250.

(Antenna Unit 210)

The antenna unit 210 emits a signal output by the wireless communication unit 220 to a space as a radio wave. In addition, the antenna unit 210 converts a radio wave of a space into a signal and outputs the signal to the wireless communication unit 220.

Figure 12:
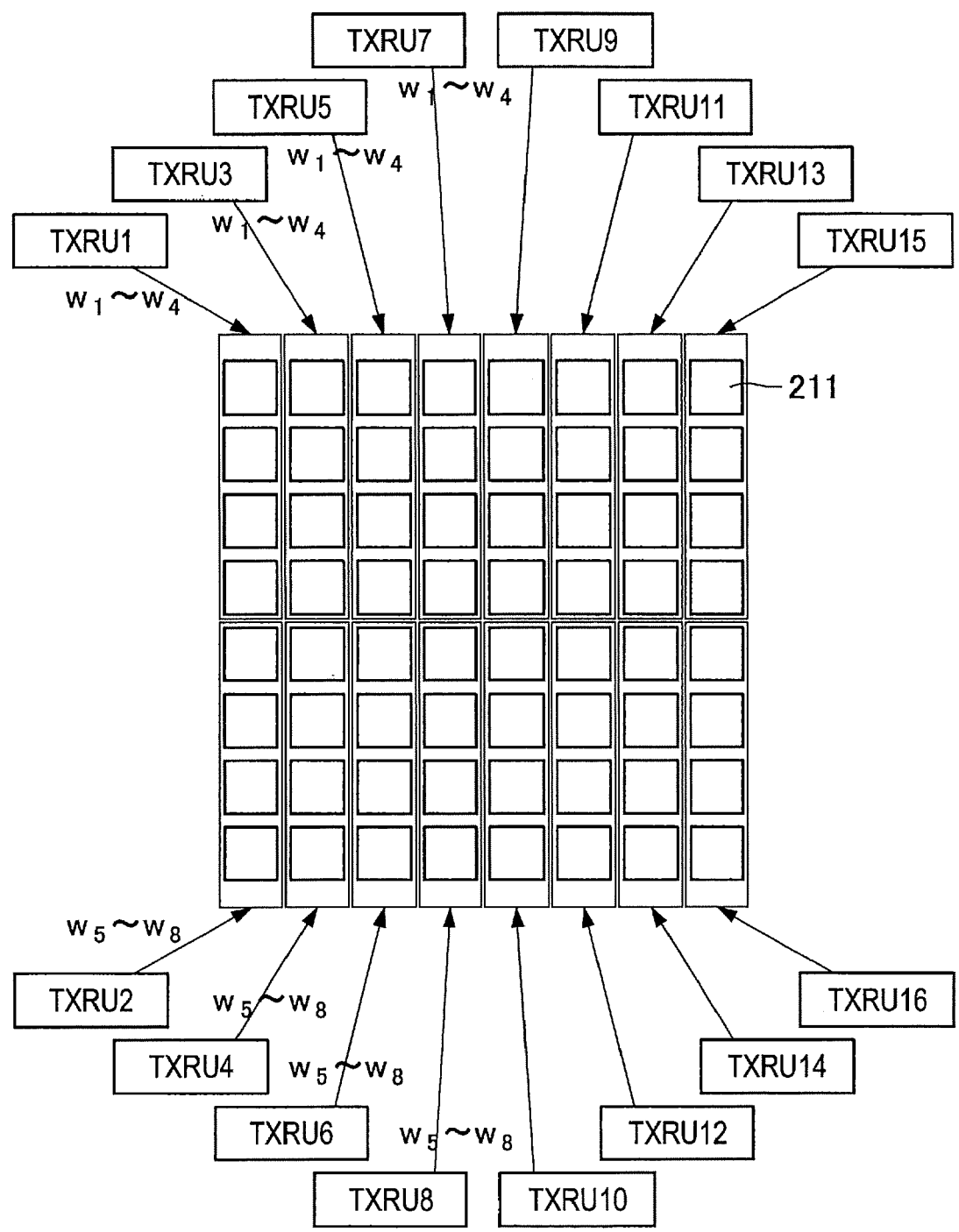
FIG. 12 is an explanatory diagram illustrating an example of an antenna unit 210.

The antenna unit 210 includes a directional antenna in the present embodiment. For example, the directional antenna is a directional antenna that can be used for FD-MIMO. FIG. 12 is an explanatory diagram illustrating an example of the antenna unit 210. The antenna unit 210 includes two-dimensionally disposed antenna elements 211 (e.g., 64 antenna elements 211), and the antenna elements 211 are divided into sub arrays (e.g., 16 sub arrays) in the present embodiment.

16 TXRUs illustrated in FIG. 12 are connected to 16 sub arrays one to one via cell specific weighting matrices. Two sub arrays and TXRUs are disposed in the vertical direction. Weighting factors $W_1$ to $W_4$ and $W_5$ to $W_8$ used by two TXRUs in the vertical direction are different, and beams are generated in different directions. Eight sub arrays and TXRUs are disposed in the horizontal direction (column direction). These eight TXRUs in the horizontal direction use the same weighting matrix, and generate beams in the same direction.

(Wireless Communication Unit 220)

The wireless communication unit 220 transmits and receives signals. For example, the wireless communication unit 220 transmits a downlink signal to a terminal device and receives an uplink signal from a terminal device.

(Network Communication Unit 230)

The network communication unit 230 transmits and receives information. For example, the network communication unit 230 transmits information to another node and receives information from another node. The other node includes, for example, a core network and another base station. The other node includes the control entity 300 as an example.

(Storage Unit 240)

The storage unit 240 temporarily or permanently stores programs and data that are necessary for the operation of the base station 200.

(Processing Unit 250)

The processing unit 250 provides the various functions of the base station 200. The processing unit 250 includes an information acquisition unit 251 and a control unit 253. Note that the processing unit 250 can further include other components in addition to these components. That is, the processing unit 250 can perform other operations in addition to the operations of the components.

(Information Acquisition Unit 251)

The information acquisition unit 251 acquires information or programs for the operation of the base station 200 or information received from another node. The information acquisition unit 251 can acquire information or programs for the operation of the base station 200 from the storage unit 240. The information acquisition unit 251 acquires information (channel state report) transmitted from each terminal device 100 in accordance with a reference signal output from the antenna unit 210 in the present embodiment. The content of a channel state report transmitted from each terminal device 100 in accordance with a reference signal will be described below, but, for example, amplitude information for each reference signal for channel estimation is included.

(Control Unit 253)

The control unit 253 controls the operation of the base station 200. The control unit 253 outputs a reference signal from the antenna unit 210, for example, on a first beam generated with at least two or more different first weighting matrices (cell specific weighting matrices) in the present embodiment. Further, the control unit 253 generates a second weighting matrix (terminal specific weighting matrix) specific to each terminal device in accordance with information that is transmitted from each terminal device 100 in accordance with a reference signal output from the antenna unit 210 and acquired by the information acquisition unit 251. The control unit 253 then outputs data for each terminal device 100 from the antenna unit 210 on a second beam generated with the first weighting matrices and the second weighting matrix.

The functional configuration example of the base station 200 according to an embodiment of the present disclosure has been described above. Next, a functional configuration example of the control entity 300 according to an embodiment of the present disclosure will be described.

(1.2.4. Configuration Example of Control Entity)

Figure 13:
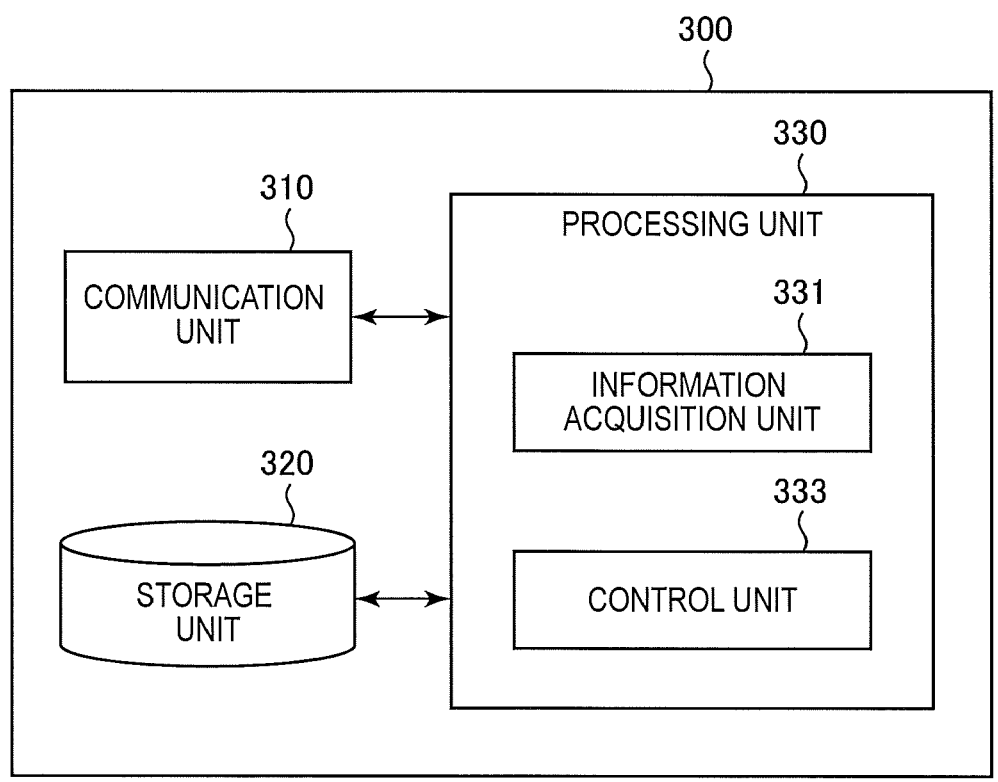
FIG. 13 is a block diagram illustrating a functional configuration example of a control entity 300 according to an embodiment of the present disclosure.

FIG. 13 is a block diagram illustrating a functional configuration example of the control entity 300 according to an embodiment of the present disclosure. As illustrated in FIG. 13, the control entity 300 according to the embodiment of the present disclosure includes a communication unit 310, a storage unit 320, and a processing unit 330.

(Communication Unit 310)

The communication unit 310 transmits and receives information. For example, the communication unit 310 transmits information to another node and receives information from another node. The other node includes, for example, a core network and a base station. The other node includes the base station 200 as an example.

(Storage Unit 320)

The storage unit 320 temporarily and permanently stores programs and data that are necessary for the operation of the control entity 300.

(Processing Unit 330)

The processing unit 330 provides the various functions of the control entity 300. The processing unit 330 includes an information acquisition unit 331 and a control unit 333. Note that the processing unit 330 can further include other components in addition to these components. That is, the processing unit 330 can perform other operations in addition to the operations of the components.

(Information Acquisition Unit 331)

The information acquisition unit 331 acquires information for the operation of the control entity 300 and information received from another node. The information acquisition unit 331 can acquire information and programs for the operation of the control entity 300 from the storage unit 320.

(Control Unit 333)

The control unit 333 controls the operation of the control entity 300. The control unit 333 can operate on the basis of information acquired by the information acquisition unit 331.

The functional configuration example of the control entity 300 according to an embodiment of the present disclosure has been described above. Next, an operation example of the communication system 1 according to an embodiment of the present disclosure will be described.

1.3. Operation Examples

The terminal device 100 and the base station 200 according to an embodiment of the present disclosure characteristically perform the following three operations for the points (1) to (4) to be clarified which are mentioned in the background above.

Operation Example 1. For (1) to (3)

The base station 200 transmits reference signals for channel estimation on cell specific beams that are generated with cell specific weighting matrices and are different in directivity. The terminal device 100 measures the reference signals for channel estimation of the cell specific beams transmitted from the base station 200 and reports a channel state including amplitude information to the base station 200. The base station 200 selects the optimum cell specific beam for the terminal device 100 from the report of the terminal device 100, and generates a terminal specific weighting matrix. The base station 200 then combines the cell specific weighting matrices with the terminal specific weighting matrix to generate a terminal specific beam (PDSCH beam), and transmits the terminal specific beam with one antenna port.

Operation Example 2. For (1) to (4)

To maintain the reception quality even in a case where the terminal device 100 moving at high speed deviates from a PDSCH beam, the terminal device 100 separates the PDSCH beam into a cell specific beam. In a case where the strength of the PDSCH beam decreases, the terminal device 100 receives the cell specific beam having wide coverage. The base station 200 notifies the terminal device 100 of information on the cell specific beam included in the PDSCH beam, or transmits reference signals (DM-RS and CSI-RS) subjected to a terminal specific weighting matrix with another antenna port.

Operation Example 3. For (1) to (3)

The base station 200 transmits reference signals for channel estimation on cell specific beams that are generated with cell specific weighting matrices and are different in directivity. The terminal device 100 measures the reference signals for channel estimation of the cell specific beams and reports amplitude information to the base station 200. The base station 200 selects the optimum cell specific beam for the terminal device 100 in accordance with the report of the terminal device 100, and assigns and transmits data (PDSCH) for the terminal device 100 in an appropriate proportion. The base station 200 uses a sharp cell specific beam to decrease overhead, but generates no terminal specific weighting matrix.

The operation example 1 to the operation example 3 above will be specifically described below.

Regarding Operation Example 1

First, a case will be considered where the antenna unit 210 includes the 64 antenna elements 211 that are two-dimensionally disposed, and divided into 16 sub arrays, for example, as illustrated in FIG. 12.

Figure 14:
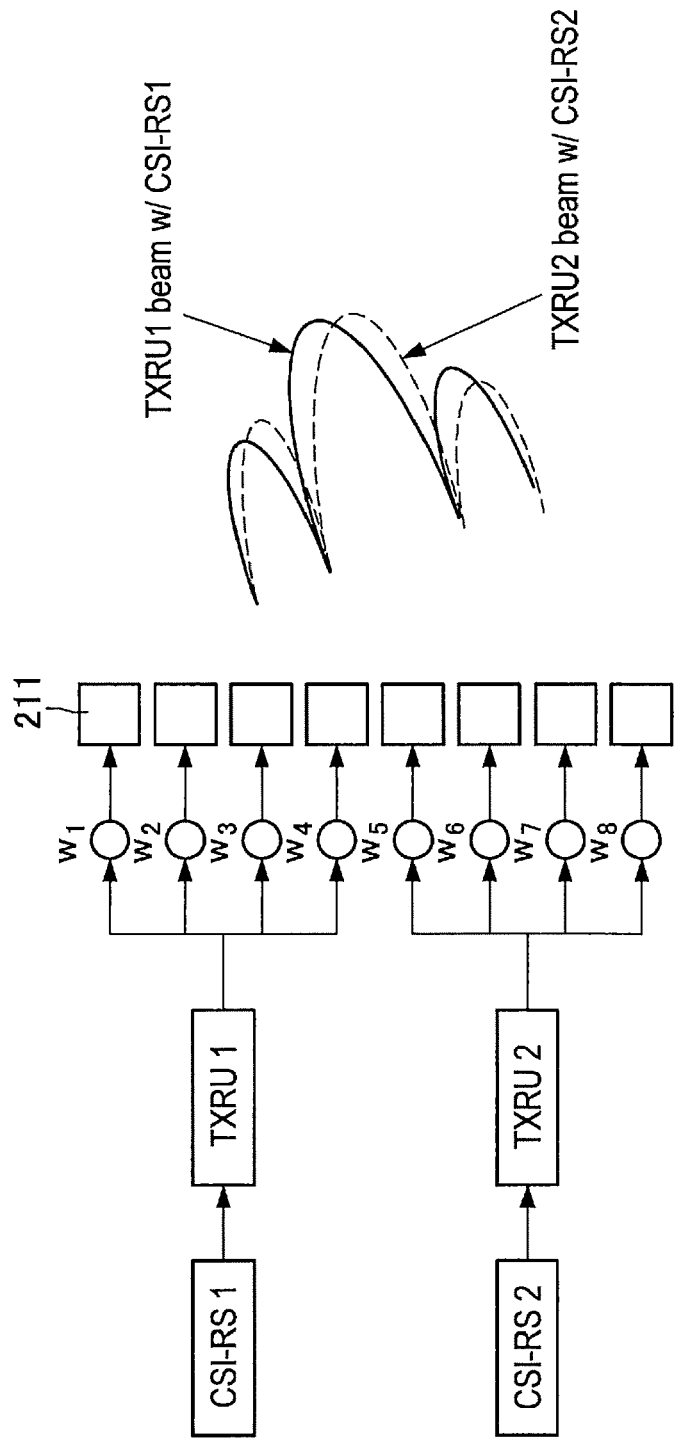
FIG. 14 is an explanatory diagram illustrating an example of directivity of a radio wave.

Each sub array includes the four antenna elements 211 arranged in the vertical direction, it is possible to decide the directivity of the radio waves emitted from the sub arrays in the vertical direction by imparting the phases of signals supplied to the four antenna elements 211 arranged in the vertical direction as weighting factors in the configuration of the antenna unit 210 illustrated in FIG. 12. FIG. 14 is an explanatory diagram illustrating an example of the directivity of radio waves emitted from two sub arrays connected to the two TXRUs of a TXRU 1 and a TXRU 2 in the configuration of the antenna unit 210 illustrated in FIG. 12. Additionally, FIG. 14 illustrates only two TXRUs for convenience of explanation. As illustrated in FIG. 14, deviating the directions of beams emitted from the two sub arrays makes it possible to widen coverage served by FD-MIMO. The radio waves emitted from these sub arrays have almost no directivity in the horizontal direction.

TXRUs 3, 5, 7, 9, 11, 13, and 15 use the same weighting matrix as that of the TXRU 1 and then emit radio waves having the same directivity as that of the TXRU 1, and TXRUs 4, 6, 8, 10, 12, 14, and 16 use the same weighting matrix as that of the TXRU 2 and then emit radio waves having the same directivity as that of the TXRU 2 in the configuration of the antenna unit 210 illustrated in FIG. 12. In this way, each TXRU uses a cell specific weighting matrix to transmit a cell specific beam (TXRU beam).

16 TXRUs transmit individual (i.e., 16 types of) CSI-RSs (CSI-RS 1 to CSI-RS 16) with different antenna port 23 to antenna port 38 (on cell specific beams). The base station 200 notifies the terminal device 100 with the CSI reference signal configuration of an antenna port for transmitting a CSI-RS, the position of a resource element at which the CSI-RS is inserted, information on a sub frame into which the CSI-RS is inserted, information of the power ratio of the CSI-RS to a PDSCH, and the like. The base station 200 notifies the terminal device 100 through RRC signaling of the CSI reference signal configuration. The terminal device 100 measures channel transmission functions between the antenna ports 23 to 38 of the base station 200 and the antenna unit 110 of the terminal device 100, for example, with the control unit 143 on the basis of the information of which the base station 200 notifies the terminal device 100. For example, if the terminal device 100 includes two antennas, there are 16×2=32 independent channel transmission functions. If an H matrix is obtained from these transmission functions, the inverse matrix of H is calculated and an MIMO operation is possible.

Further, the terminal device 100 measures reception strength for each CSI-RS, for example, with the control unit 143. 16 cell specific beams transmitted from the base station 200 are different in directivity, so that the reception strength at the terminal device 100 differs between the cell specific beams. A cell specific beam included in a PDSCH beam (terminal specific beam) to be supplied to the terminal device 100 is selected from cell specific beams having greater reception strength.

The base station 200 notifies terminal device 100 through RRC signaling whether to report an RI, a PMI, and CSI-RS amplitude information.

The terminal device 100 uses the CSI-RS amplitude information obtained in measuring reception power for each CSI-RS and the acquired H matrix to decide a PMI, an RI, a CQI, and the like, for example, with the control unit 143, and reports them to the base station 200 as a channel state report. The terminal device 100 may use CSI-RS amplitude information as amplitude information on a CSI-RS whose reception power is greater than or equal to a predefined threshold. The CSI-RS amplitude information may also be, for example, information of RSRP for each CSI-RS or information of RSRQ.

Figure 15:
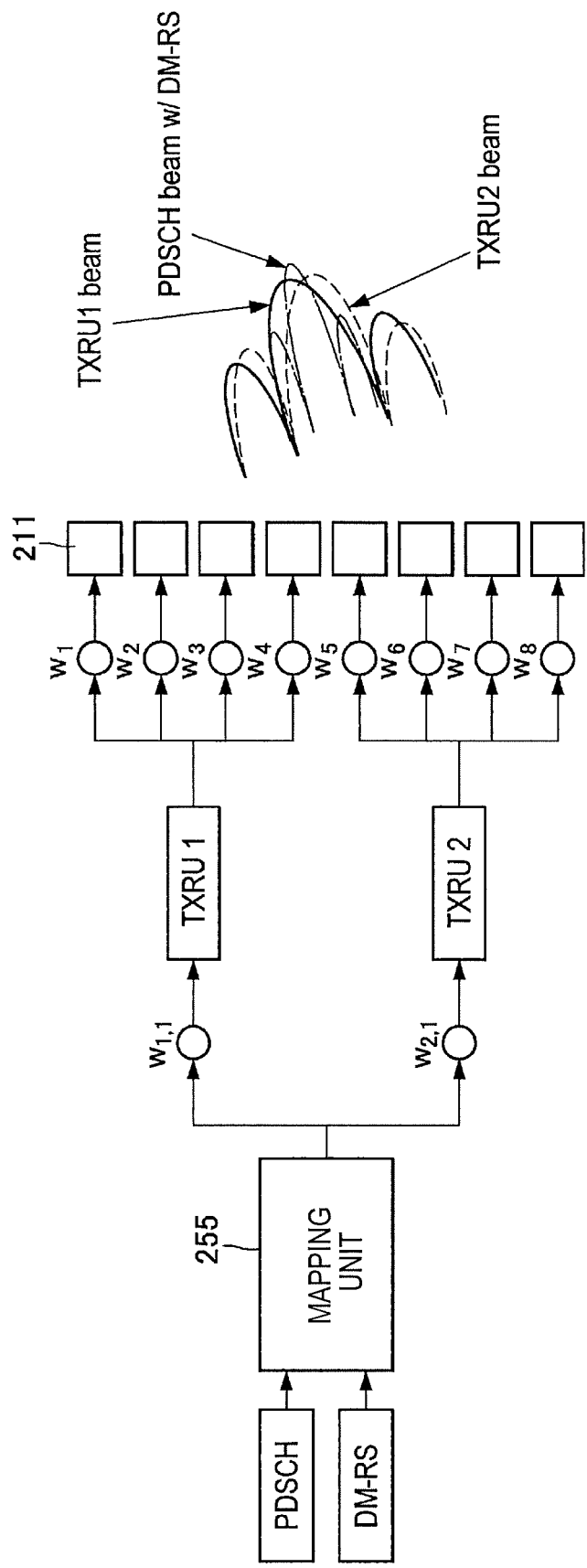
FIG. 15 is an explanatory diagram illustrating an example in which the base station 200 generates a sharp PDSCH beam.
Figure 16:
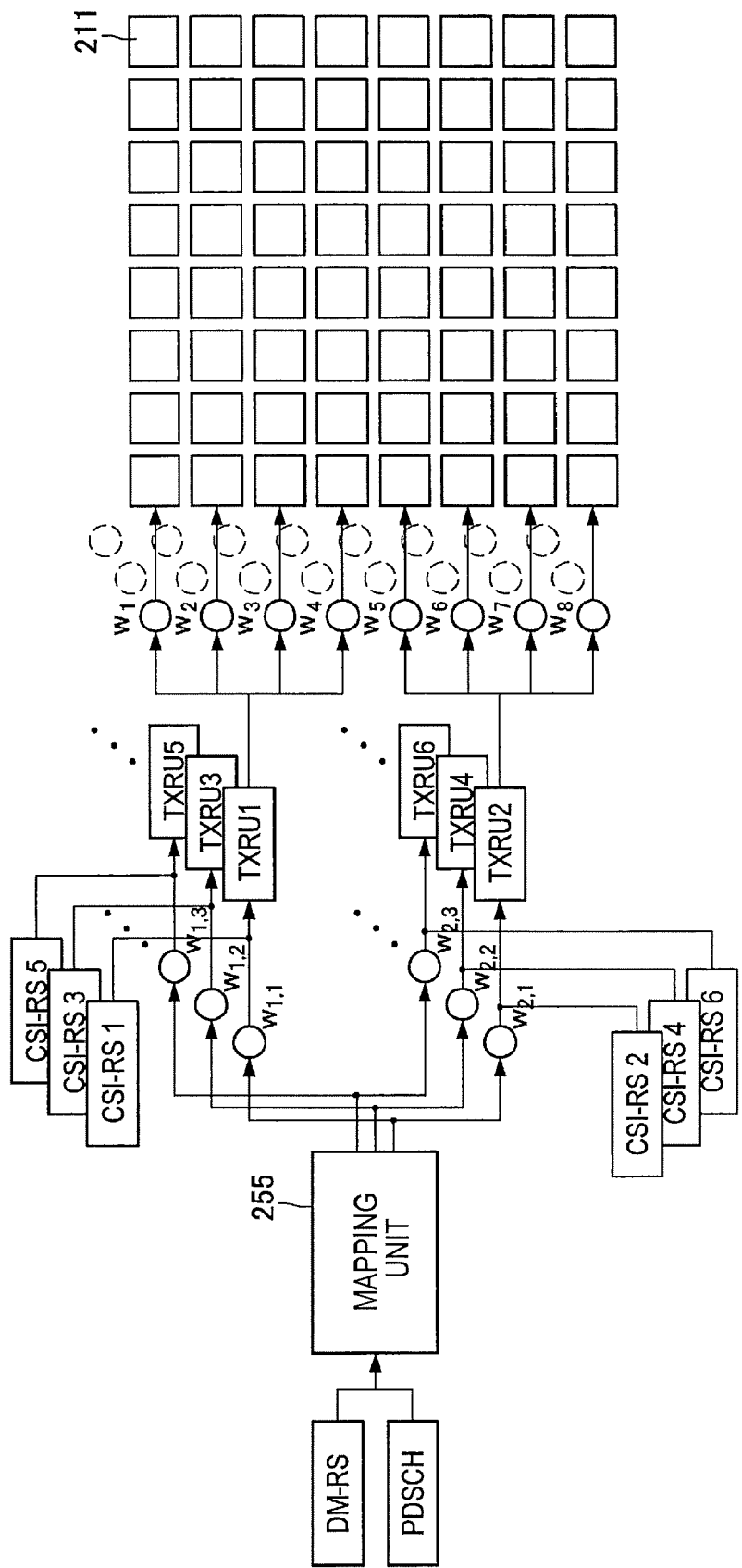
FIG. 16 is an explanatory diagram illustrating configuration examples of a cell specific weighting matrix and a terminal specific weighting matrix.

The base station 200 selects a cell specific beam appropriate for the terminal device 100 and generates a terminal specific weighting matrix, for example, with the control unit 125 on the basis of a channel state report from the terminal device 100, and transmits a PDSCH and a DM-RS for the terminal from the antenna unit 210 on a terminal specific beam generated with the terminal specific weighting matrix and the cell specific weighting matrices. FIG. 15 is an explanatory diagram illustrating an example in which the base station 200 generates a sharp PDSCH beam with cell specific weighting matrices and a terminal specific weighting matrix. Further, FIG. 16 is an explanatory diagram illustrating configuration examples of a cell specific matrix and a terminal specific matrix. The base station 200 maps PDSCHs and DM-RSs into a resource element with a mapping unit 255, imparts weighting factors $W_{1,1}$, $W_{2,1}$, $W_{1,2}$, $W_{2,2}$, $W_{1,3}$, $W_{2,3}$, $W_{1,4}$, $W_{2,4}$, $W_{1,5}$, $W_{2,5}$, $W_{1,6}$, $W_{2,6}$, $W_{1,7}$, $W_{2,7}$, $W_{1,8}$, and $W_{2,8}$ specific to the terminal, and emits them from 16 respective sub arrays through the TXRU 1 to a TXRU 16.

The base station 200 may include amplitude information in the terminal specific weighting matrix to optimize a terminal specific beam. The base station 200 can use the strength of a terminal specific beam and interference with another terminal specific beam for optimization by optimizing amplitude information of the weighting factor of a TXRU whose reception strength at the terminal device 100 is low and phase information of the weighting factor. The base station 200 may select a cell specific beam appropriate for the terminal device 100 by setting 0 for the amplitude of the weighting factor of a TXRU.

The terminal device 100 may newly define and use a PMI including CSI-RS amplitude information instead of reporting a PMT and CST-RS amplitude information to the base station 200 as different kinds of information.

Figure 17:
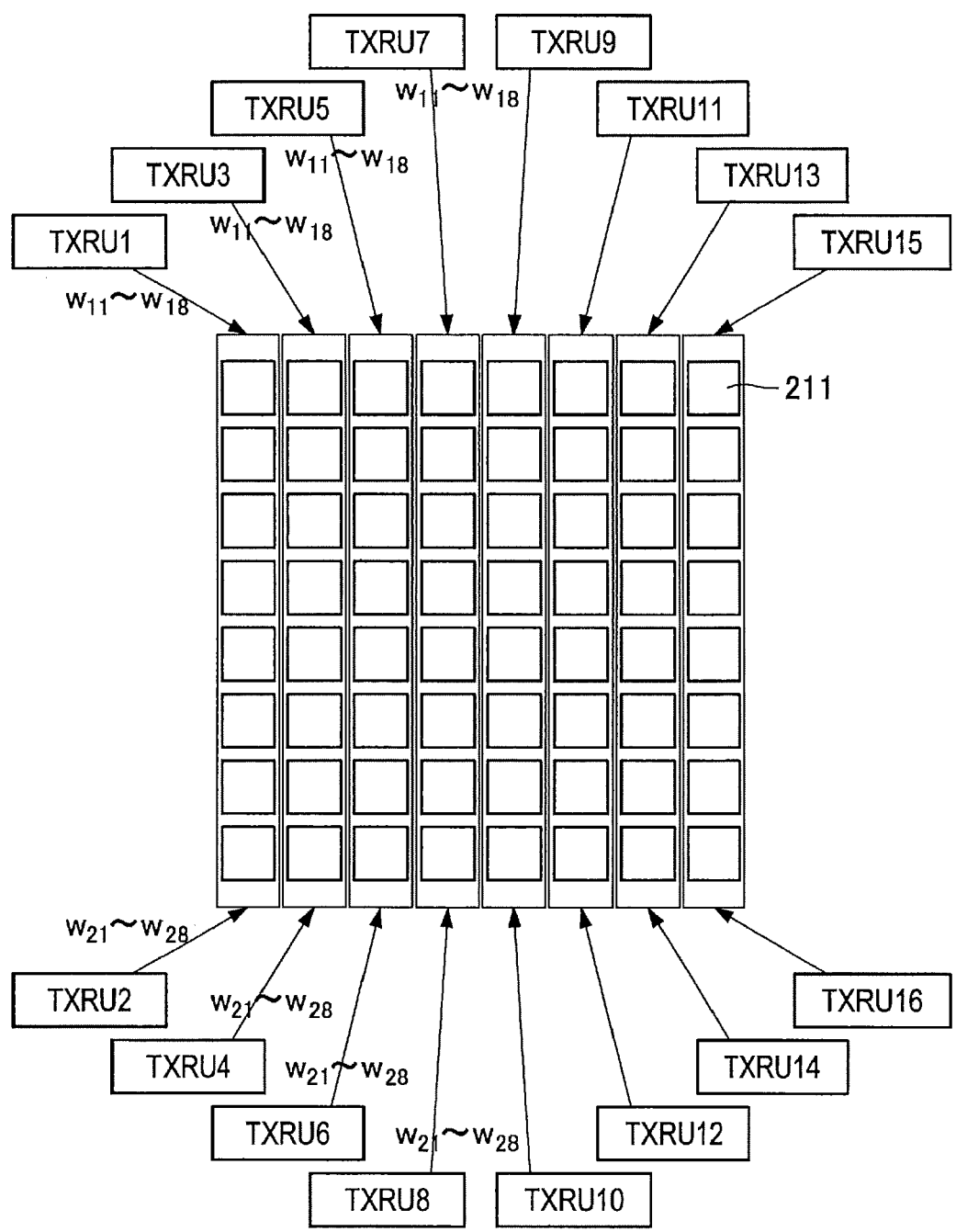
FIG. 17 is an explanatory diagram illustrating an example in which one sub array is connected to two or more TXRUs.

One sub array may also be connected to two or more TXRUs. FIG. 17 is an explanatory diagram illustrating an example in which one sub array is connected to two or more TXRUs. One sub array including eight antenna elements arranged in the vertical direction in the antenna unit 210 is connected to two TXRUs. Although the TXRU 1 and the TXRU 2 are connected to the same sub array in the configuration of the antenna unit 210 illustrated in FIG. 17, the TXRU 1 uses weighting factors $W_{11}$ to $W_{18}$ and the TXRU 2 uses $W_{21}$ to $W_{28}$, which indicate different directivity from the directivity of the weighting factors $W_{11}$ to $W_{18}$. The total number of TXRUs is 16, and the same as that of the case illustrated in FIG. 12. More antenna elements are, however, used for transmitting one TXRU beam, sharpening a TXRU beam.

Figure 18:
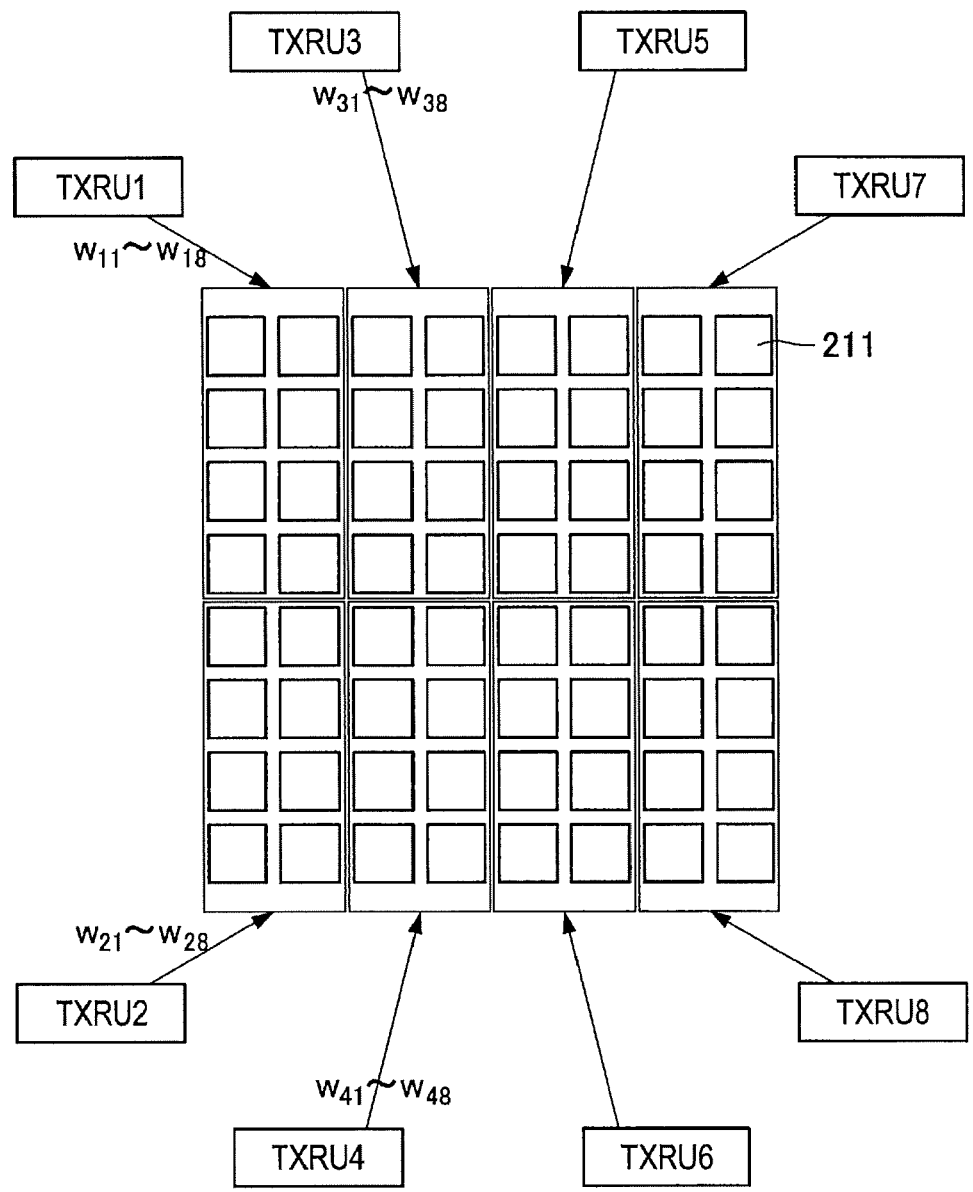
FIG. 18 is an explanatory diagram illustrating an example in which one sub array including eight antenna elements is connected to one TXRU.

Further, the above description shows the example in which the TXRUs in the horizontal direction use the same weighting matrices to generate beams in the same direction, but the present disclosure is not limited to that example. FIG. 18 is an explanatory diagram illustrating an example in which one sub array including four antenna elements arranged in the vertical direction and two antenna elements arranged in the horizontal direction in the antenna unit 210 is connected to one TXRU. For example, as illustrated in FIG. 18, each TXRU may use different cell specific weighting matrices. One sub array illustrated in FIG. 18 includes two antenna elements in the horizontal direction, so that the antenna unit 210 illustrated in FIG. 18 can also have directivity in the horizontal direction. The TXRUs 1, 3, 5, and 7 of the antenna unit 210 illustrated in FIG. 18 configure cell specific beams different in directivity in the horizontal direction.

Figure 19:
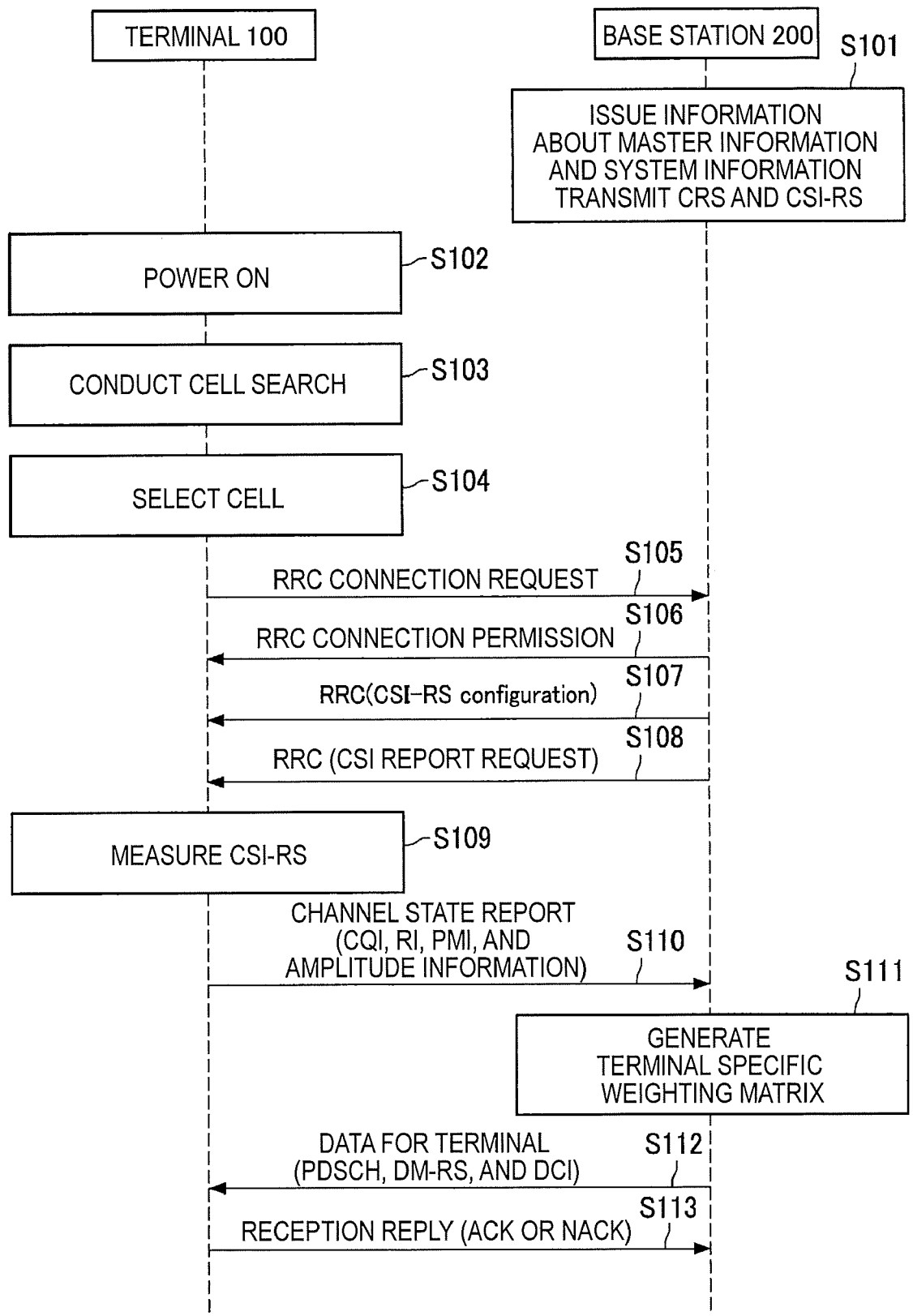
FIG. 19 is a flowchart illustrating operation examples of the terminal device 100 and the base station 200 according to an embodiment of the present disclosure.

FIG. 19 is a flowchart illustrating operation examples of the terminal device 100 and the base station 200 according to an embodiment of the present disclosure. FIG. 19 illustrates an operation example in which the base station 200 generates a terminal specific weighting matrix on the basis of a report from the terminal device 100, and generates a beam for the terminal device 100. The following uses FIG. 19 to describe operation examples of the terminal device 100 and the base station 200 according to an embodiment of the present disclosure.

The base station 200 transmits, from the antenna unit 210, cell specific reference signals (CRSs) with a resource element decided on the basis of physical layer cell IDs (PCIs) and the number of transmitting antennas in all the sub frames (step S101). The base station 200 uses different antenna ports to transmit CSI-RSs through cell specific weighting matrices for each TXRU. The base station 200 transmits a CSI-RS at the predefined position of a resource element in a predefined sub frame.

If the terminal device 100 is powered on (step S102), the terminal device 100 conducts a cell search with a frequency channel having high priority (step S103). The terminal device 100 detects a first synchronization signal (PSS) and a second synchronization signal (SSS), and detects a physical layer cell ID (PCI) and frame timing. The terminal device 100 can decode a master information block (MIB) and a system information block (SIB), learn, from the already detected PCI and the number of transmitting antennas included in the base station 200, the position of a resource element into which a cell specific reference signal (CRS) is inserted, and measure the reception strength thereof. The terminal device 100 measures the strength of nearby CRSs with the control unit 143, and selects the optimum cell (step S104)

The terminal device 100 that selects the optimum cell sends an RRC connection request to the base station 200 (step S105). The control unit 143 transmits an RRC connection request in step S105 through the antenna unit 110. The base station 200 that receives the RRC connection request sends an RRC connection permission to the terminal device 100 (step S106). The control unit 253 transmits an RRC connection permission in step S106 through the antenna unit 210. If the base station 200 sends an RRC connection permission to the terminal device 100 that transmits an RRC connection request, the terminal device 100 and the base station 200 enter an RRC connection state (RRC Connected).

Next, the base station 200 notifies the terminal device 100 in the RRC connection state through RRC signaling of information on an antenna port with which a CSI-RS is transmitted, the position of information on a resource element into which the CSI-RS is inserted, and a sub frame into which the CSI-RS is inserted (step S107). The control unit 253 notifies the terminal device 100 in step S107 through the antenna unit 210. Further, the base station 200 notifies the terminal device 100 through RRC signaling whether to report an RI, a PMI, and CSI-RS amplitude information for the CSI-RS (step S108). The control unit 253 notifies the terminal device 100 in step S108 through the antenna unit 210.

The terminal device 100 that receives the notification from the base station 200 measures a CSI-RS greater than or equal to a predefined reception strength threshold (step S109). The control unit 143 performs the measurement of step S109. The terminal device 100 transmits, to the base station, a report (channel state report) of a CQI, an RI, a PMI, and CSI-RS amplitude information for a CSI-RS in accordance with a request from the base station 200 (step S110). The control unit 143 transmits a channel state report in step S110 through the antenna unit 110. The CSI-RS amplitude information may be sent separately from the PMI, or sent as a PMI including amplitude information.

The base station 200 that receives the channel state report from the terminal device 100 selects the optimum TXRU for the terminal device 100 in accordance with the report from the terminal device 100, and generates a weighting matrix (terminal specific weighting matrix) specific to the terminal (step S111). The control unit 253 generates a terminal specific weighting matrix in step S111.

If the base station 200 generates a terminal specific weighting matrix in step S111, the base station 200 transmits the PDSCH and DM-RS assigned to the terminal device 100 on a terminal specific beam (PDSCH beam) through the terminal specific weighting matrix and the cell specific weighting matrices (step S112). Further, the base station 200 issues a notification of an antenna port with which the PDSCH and DM-RS assigned to the terminal device 100 are transmitted with downlink control information (DCI) (step S112). The control unit 253 transmits in step S112 through the antenna unit 210. When transmitting the PDSCH and the DM-RS, the base station 200 may assign the same resource block to PDSCH beams having different directions to multiplex data for the terminal devices 100.

The terminal device 100 that can receive the PDSCH, the DM-RS, and the DCI from the base station 200 transmits a reception reply (ACK) to the base station (step S113). Further, the terminal device 100 that fails to receive the PDSCH, the DM-RS, and the DCI from the base station 200 transmits a reception reply (NACK) to the base station (step S113). The control unit 143 transmits a reception reply in step S113 through the antenna unit 110.

The terminal device 100 and the base station 200 execute the above-described series of processes. The base station 200 can hereby generate an appropriate beam for the terminal device 100. Further, the terminal device 100 can receive the beam appropriate for reception from the base station 200.

Regarding Operation Example 2

First, a case will be considered where the antenna unit 210 includes the 64 antenna elements 211 that are two-dimensionally disposed, and divided into eight sub arrays in total, for example, as illustrated in FIG. 18. One sub array includes the two antenna elements 211 in the horizontal direction and the four antenna elements 211 in the vertical direction.

The eight TXRUs 1 to 8 illustrated in FIG. 18 transmit individual (i.e., eight types of) CSI-RSs (CSI-RS 1 to CSI-RS 8) with respective antenna port 23 to antenna port 30 (on cell specific beams). The base station 200 notifies the terminal device 100 with the CSI reference signal configuration of an antenna port for transmitting a CSI-RS, the position of a resource element at which the CSI-RS is inserted, information on a sub frame into which the CSI-RS is inserted, information of the power ratio between the CSI-RS and a PDSCH, and the like. For example, if the terminal device 100 includes two antennas, there are 8×2=16 independent channel transmission functions. If an H matrix is obtained from these transmission functions, the inverse matrix of H is calculated and an MIMO operation is possible.

Further, the terminal device 100 measures reception strength for each CSI-RS, for example, with the control unit 143. Eight cell specific beams transmitted from the base station 200 are different in directivity, so that the reception strength at the terminal device 100 differs between the cell specific beams. A cell specific beam included in a PDSCH beam (terminal specific beam) to be supplied to the terminal device 100 is selected from cell specific beams having greater reception strength.

The base station 200 notifies terminal device 100 through RRC signaling whether to report an RI, a PMI, and CSI-RS amplitude information.

The terminal device 100 uses the CSI-RS amplitude information obtained in measuring reception power for each CSI-RS and the acquired H matrix to decide a PMI, an RI, a CQI, and the like, for example, with the control unit 143, and reports them to the base station 200 as a channel state report. The terminal device 100 may use CSI-RS amplitude information as amplitude information on a CSI-RS whose reception power is greater than or equal to a predefined threshold. The CSI-RS amplitude information may also be, for example, information of RSRP for each CSI-RS or information of RSRQ. The terminal device 100 may newly define and use a PMI including amplitude information instead of reporting a PMI and CSI-RS amplitude information to the base station 200 as different kinds of information.

The base station 200 selects a cell specific beam appropriate for the terminal device 100 and generates a terminal specific weighting matrix, for example, with the control unit 125 on the basis of a channel state report from the terminal device 100, and transmits a PDSCH and a DM-RS for the terminal from the antenna unit 210 on a terminal specific beam generated with the terminal specific weighting matrix and the cell specific weighting matrices.

The base station 200 may include amplitude information in the terminal specific weighting matrix to optimize a terminal specific beam. The base station 200 can use the strength of a terminal specific beam and interference with another terminal specific beam for optimization by optimizing amplitude information of the weighting factor of a TXRU whose reception strength at the terminal device 100 is low and phase information of the weighting factor. The base station 200 may select a cell specific beam appropriate for the terminal device 100 by setting 0 for the amplitude of the weighting factor of a TXRU. Additionally, one sub array may also be connected to one TXRU, or connected to two or more TXRUs as described above in this operation example 2.

The base station 200 multiplies the CSI-RS transmitted on a cell specific beam included in a terminal specific beam by a terminal specific weighting factor in a resource block to which the PDSCH of the terminal device 100 is assigned and transmits the CSI-RS, so that the terminal device 100 can separate and transmit the cell specific beam included in the terminal specific beam in this operation example 2. The base station 200 may define and assign a reference signal specific to the terminal such as a DM-RS for each cell specific beam included in a terminal specific beam instead of transmitting a CSI-RS in a resource block assigned to the terminal device 100, multiply the terminal specific reference signal by a terminal specific weighting factor, and transmit the terminal specific reference signal.

Figure 20:
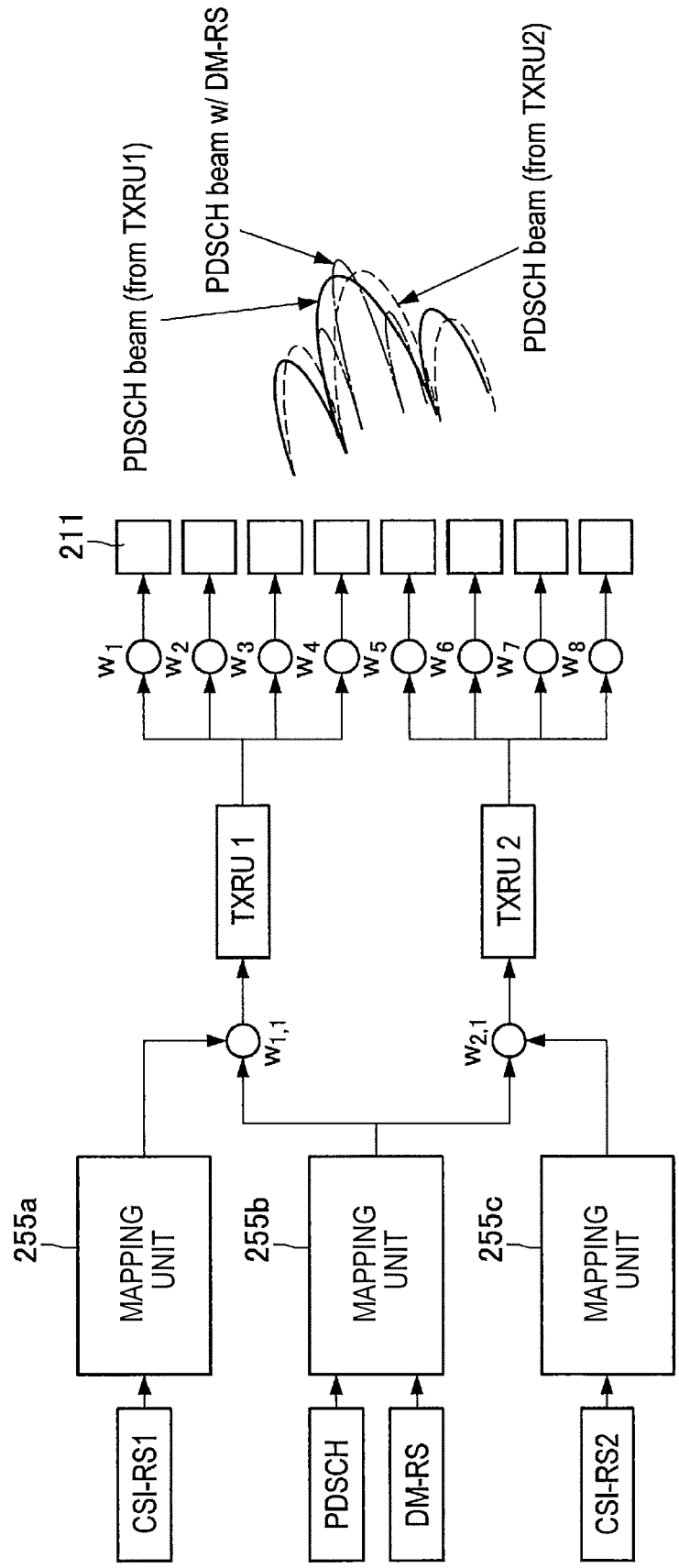
FIG. 20 is an explanatory diagram illustrating an example in which the base station 200 imparts a cell specific weighting matrix and a terminal specific weighting factor and transmits a CSI-RS.
Figure 21:
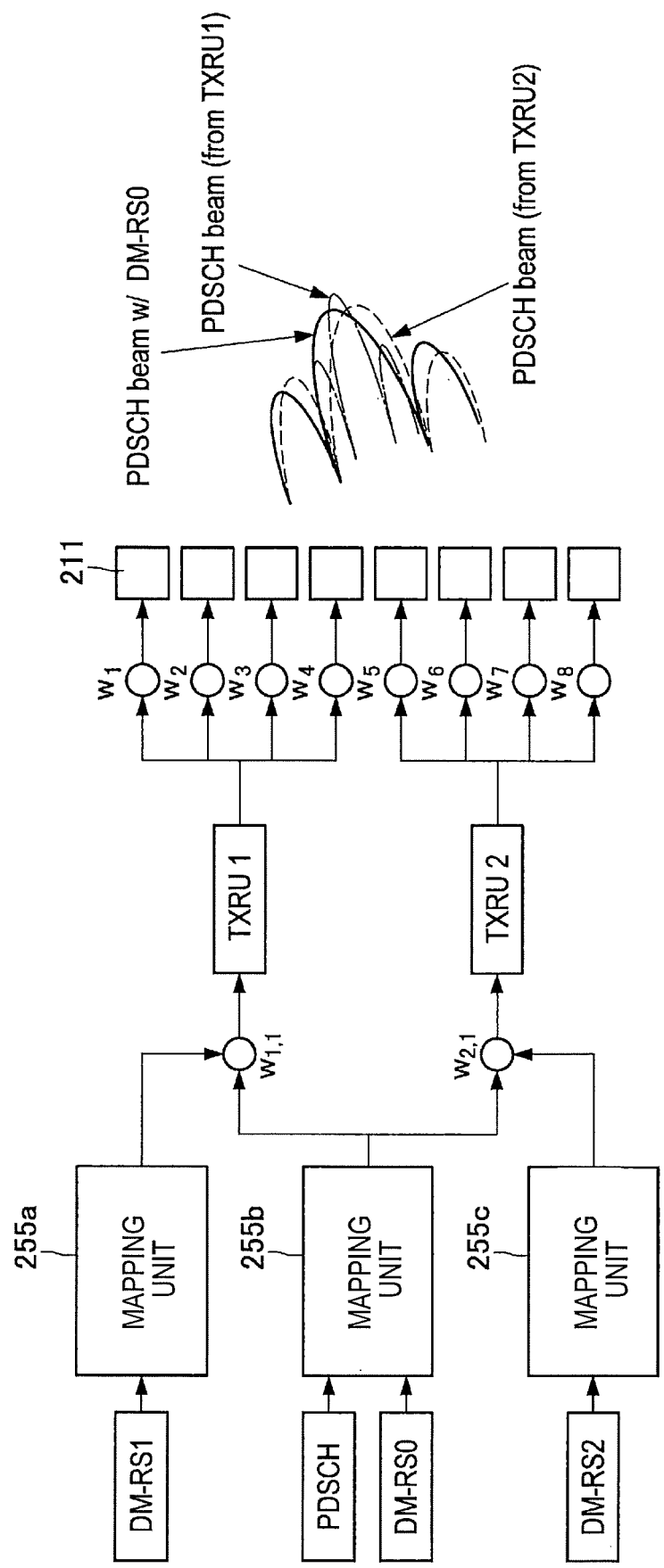
FIG. 21 is an explanatory diagram illustrating an example in which the base station 200 imparts a cell specific weighting matrix and a terminal specific weighting factor and transmits a DM-RS.
Figure 22:
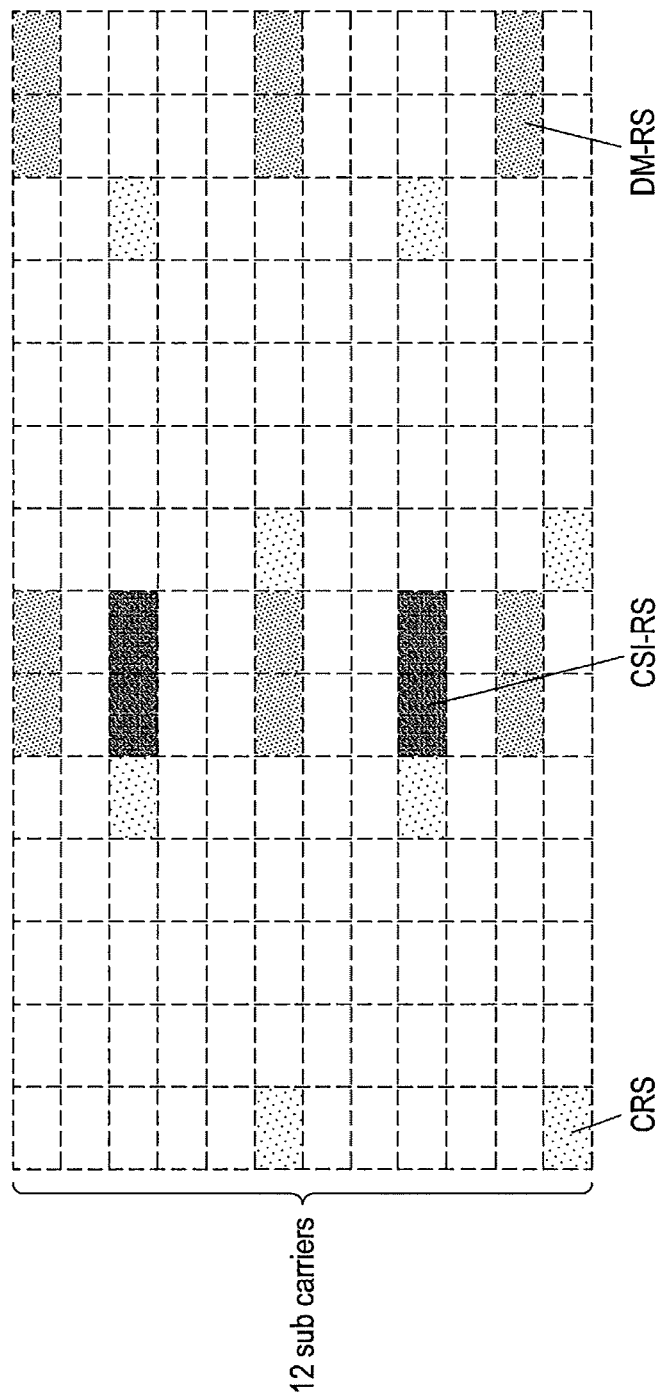
FIG. 22 is an explanatory diagram illustrating an example of a resource block for transmitting a CSI-RS on a resource block assigned to the terminal device 100.
Figure 23:
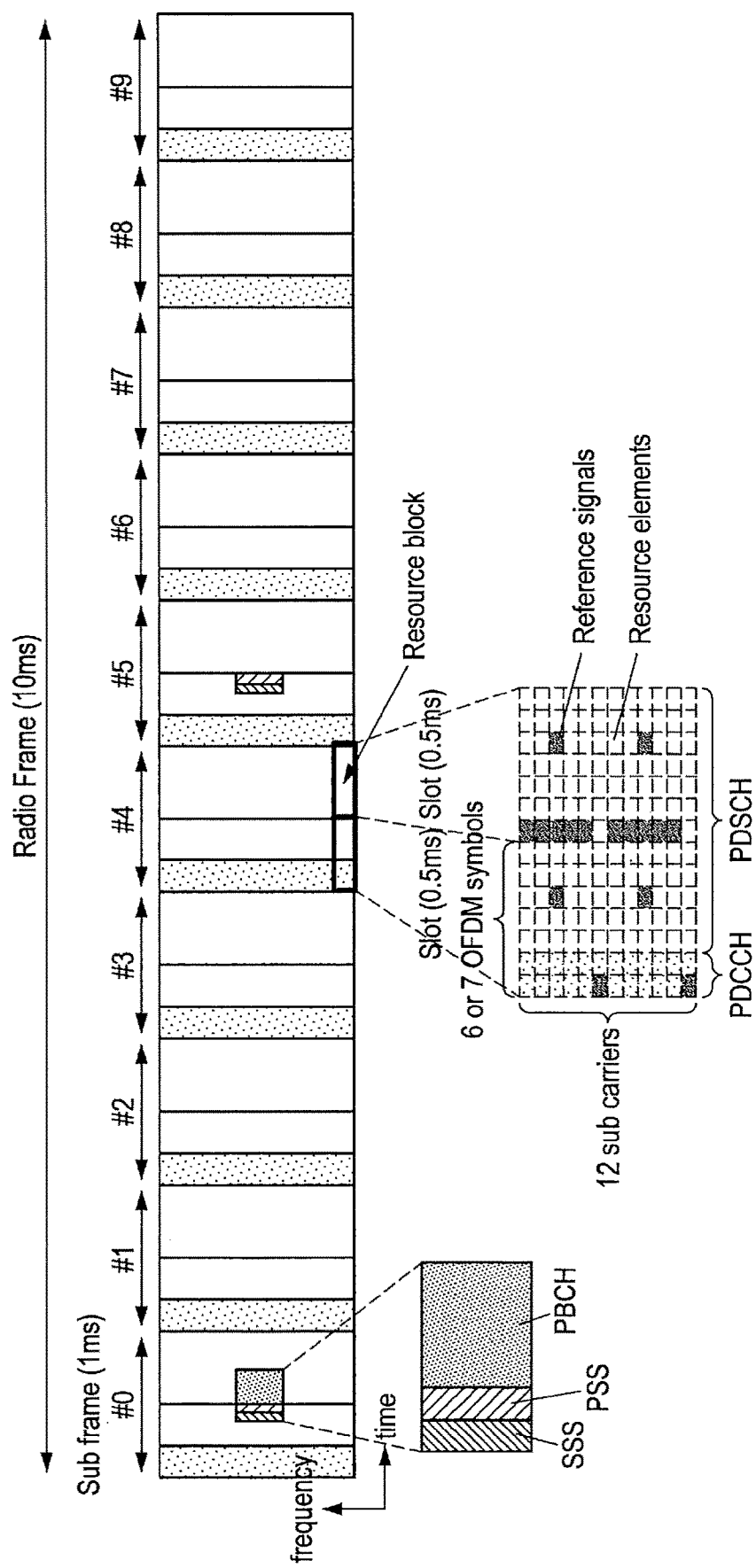
FIG. 23 is an explanatory diagram illustrating an example in which a resource block assigned to the terminal device 100 is disposed in a radio frame.

FIG. 20 is an explanatory diagram illustrating an example in which the base station 200 imparts a cell specific weighting matrix and a terminal specific weighting factor and transmits a CSI-RS. Further, FIG. 21 is an explanatory diagram illustrating an example in which the base station 200 imparts a cell specific weighting matrix and a terminal specific weighting factor and transmits a DM-RS. FIG. 22 is an explanatory diagram illustrating an example of a resource block for transmitting a CSI-RS on a resource block assigned to the terminal device 100. FIG. 23 is then an explanatory diagram illustrating an example in which a resource block assigned to the terminal device 100 is disposed in a radio frame.

The base station 200 maps the CSI-RS 1 with a mapping unit 253a, a PDSCH and a DM-RS with the mapping unit 253a, and the CSI-RS 2 with a mapping unit 253c to respective resource elements, imparts the weighting factors $W_{1,1}$, $W_{2,1}$, $W_{1,2}$, $W_{2,2}$, $W_{1,3}$, $W_{2,3}$, $W_{1,4}$, and $W_{2,4}$ specific to the terminal, and emits them from eight respective sub arrays through the TXRU 1 to TXRU 8 in the example of FIG. 20.

The base station 200 maps a DM-RS 1 with the mapping unit 253a, a PDSCH and a DM-RS 0 with the mapping unit 253a, and a DM-RS 2 with the mapping unit 253c to respective resource elements, imparts the weighting factors $W_{1,1}$, $W_{2,1}$, $W_{1,2}$, $W_{2,2}$, $W_{1,3}$, $W_{2,3}$, $W_{1,4}$, and $W_{2,4}$ specific to the terminal, and emits them from eight respective sub arrays through the TXRU 1 to TXRU 8 in the example of FIG. 21.

A CSI-RS transmitted on a resource block assigned to the terminal device 100 is sent separately from a CSI-RS for which the position of its resource element and the position of the sub frame are indicated by the CSI reference signal configuration of RRC signaling.

The base station 200 notifies the terminal device 100 with DCI of cell specific beam configuration information including information of the antenna port of a cell specific beam included in a terminal specific beam (PDSCH beam). The base station 200 may include information on a terminal specific weighting matrix in cell specific beam configuration information of which the terminal device 100 is notified. The information on the terminal specific weighting matrix of the base station 200 may include the value of a weighting factor or an index of a variation of the weighting matrix.

The terminal device 100 learns, from the cell specific beam configuration information of which the terminal device 100 is notified by the base station 200, the antenna port of a cell specific beam included in a PDSCH beam, and measures CSI-RSs disposed in the resource block assigned to the terminal device 100. The terminal device 100 measures the CSI-RSs disposed in the resource block assigned to the terminal device 100, and the terminal device 100 can hereby make it possible to separate the terminal specific beam (PDSCH beam) transmitted from the base station 200 into a cell specific beam. In a case where the terminal device 100 is positioned on the fringe of a sharp PDSCH beam, the terminal device 100 can select and stably receive a cell specific beam having a wide range before the optimization of the base station 200 with respect to the PDSCH beam direction if it is possible to separate the PDSCH beam into a cell specific beam.

Figure 24:
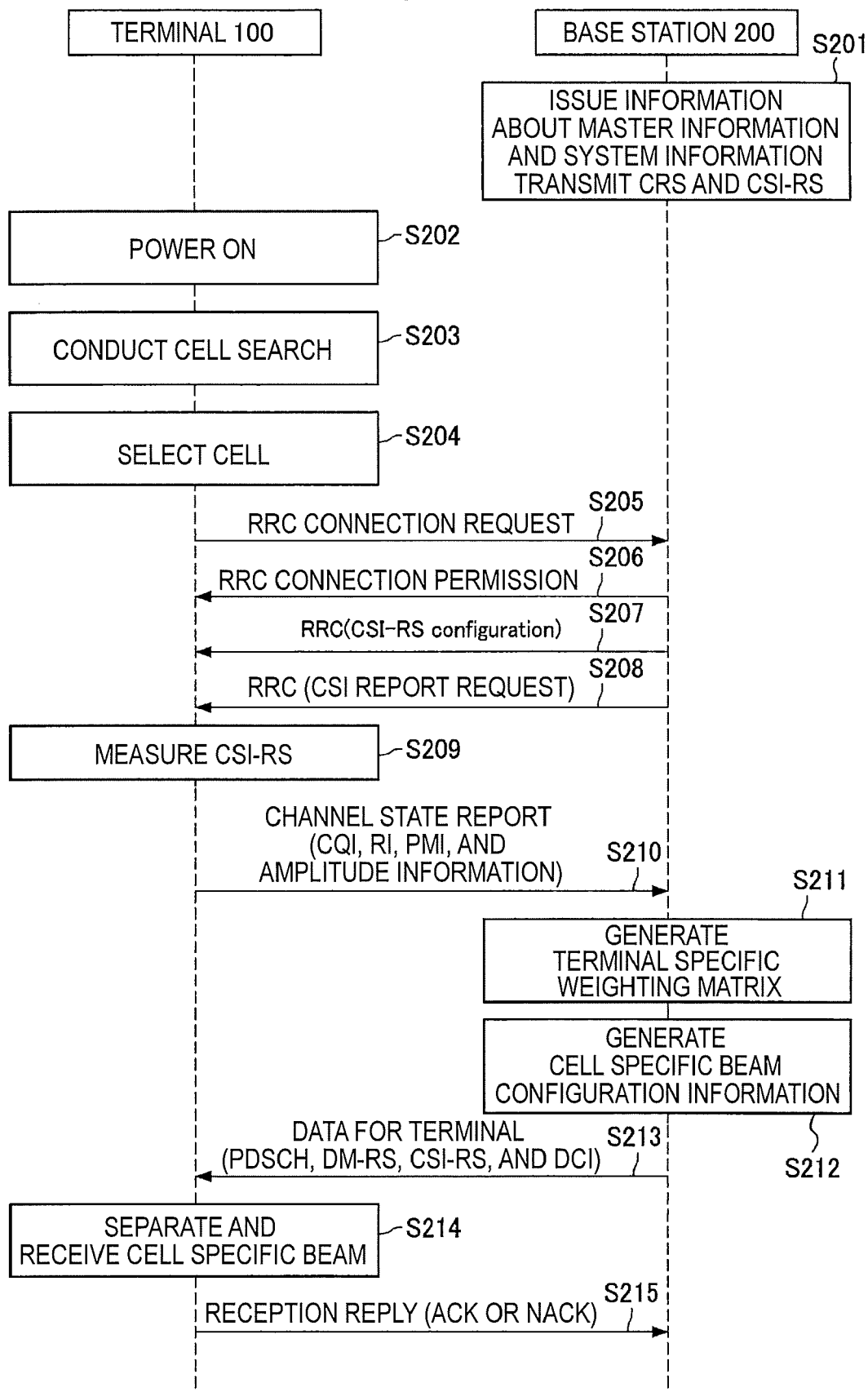
FIG. 24 is a flowchart illustrating operation examples of the terminal device 100 and the base station 200 according to an embodiment of the present disclosure.

FIG. 24 is a flowchart illustrating operation examples of the terminal device 100 and the base station 200 according to an embodiment of the present disclosure. FIG. 24 illustrates an operation example in which the base station 200 generates a terminal specific weighting matrix on the basis of a report from the terminal device 100, and generates a beam for the terminal device 100. The following uses FIG. 24 to describe operation examples of the terminal device 100 and the base station 200 according to an embodiment of the present disclosure.

The base station 200 transmits, from the antenna unit 210, cell specific reference signals (CRSs) with a resource element decided on the basis of physical layer cell IDs (PCIs) and the number of transmitting antennas in all the sub frames (step S201). The base station 200 uses different antenna ports to transmit CSI-RSs through cell specific weighting matrices for each TXRU. The base station 200 transmits a CSI-RS at the predefined position of a resource element in a predefined sub frame.

If the terminal device 100 is powered on (step S202), the terminal device 100 conducts a cell search with a frequency channel having high priority (step S203). The terminal device 100 detects a first synchronization signal (PSS) and a second synchronization signal (SSS), and detects a physical layer cell ID (PCI) and frame timing. The terminal device 100 can decode a master information block (MIB) and a system information block (SIB), learn, from the already detected PCI and the number of transmitting antennas included in the base station 200, the position of a resource element into which a cell specific reference signal (CRS) is inserted, and measure the reception strength thereof. The terminal device 100 measures the strength of nearby CRSs with the control unit 143, and selects the optimum cell (step S204).

The terminal device 100 that selects the optimum cell sends an RRC connection request to the base station 200 (step S205). The control unit 143 transmits an RRC connection request in step S205 through the antenna unit 110. The base station 200 that receives the RRC connection request sends an RRC connection permission to the terminal device 100 (step S206). The control unit 253 transmits an RRC connection permission in step S206 through the antenna unit 210. If the base station 200 sends an RRC connection permission to the terminal device 100 that transmits an RRC connection request, the terminal device 100 and the base station 200 enter an RRC connection state (RRC Connected).

Next, the base station 200 notifies the terminal device 100 in the RRC connection state through RRC signaling of information on an antenna port with which a CSI-RS is transmitted, the position of information on a resource element into which the CSI-RS is inserted, and a sub frame into which the CSI-RS is inserted (step S207). The control unit 253 notifies the terminal device 100 in step S207 through the antenna unit 210. Further, the base station 200 notifies the terminal device 100 through RRC signaling whether to report an RI, a PMT, and CSI-RS amplitude information for the CSI-RS (step S208). The control unit 253 notifies the terminal device 100 in step S208 through the antenna unit 210.

The terminal device 100 that receives the notification from the base station 200 measures a CSI-RS greater than or equal to a predefined reception strength threshold (step S209). The control unit 143 performs the measurement of step S209. The terminal device 100 transmits, to the base station, a report (channel state report) of a CQI, an R1, a PMI, and CSI-RS amplitude information for a CSI-RS in accordance with a request from the base station 200 (step S210). The control unit 143 transmits a channel state report in step S210 through the antenna unit 110. The CSI-RS amplitude information may be sent separately from the PMI, or sent as a PMI including amplitude information.

The base station 200 that receives the channel state report from the terminal device 100 selects the optimum TXRU for the terminal device 100 in accordance with the report from the terminal device 100, and generates a weighting matrix (terminal specific weighting matrix) specific to the terminal (step S211). The control unit 253 generates a terminal specific weighting matrix in step S211.

If the base station 200 generates a terminal specific weighting matrix in step S211, the base station 200 transmits the PDSCH and DM-RS assigned to the terminal device 100 on a terminal specific beam (PDSCH beam) through the terminal specific weighting matrix and the cell specific weighting matrices (step S212). Further, the base station 200 issues a notification of an antenna port with which the PDSCH and DM-RS assigned to the terminal device 100 are transmitted with downlink control information (DCI) (step S212). The control unit 253 transmits in step S212 through the antenna unit 210.

The base station 200 disposes a PDSCH, a DM-RS, and a CSI-RS in a resource block assigned to the terminal device 100. The PDSCH and the DM-RS are multiplied by a terminal specific weighting matrix and cell specific weighting matrices, and transmitted on a cell specific beam (PDSCH beam). Further, the base station 200 transmits the CSI-RS of a cell specific beam included in the PDSCH beam through a terminal specific weighting factor and the cell specific weighting matrices.

Further, the base station 200 generates cell specific beam configuration information including information of the antenna port of a cell specific beam included in a terminal specific beam (PDSCH beam) (step S213), and notifies the terminal device 100 with DCI. The base station 200 may include information on a terminal specific weighting matrix in cell specific beam configuration information of which the terminal device 100 is notified. The information on the terminal specific weighting matrix of the base station 200 may include the value of a weighting factor or an index of a variation of the weighting matrix.

If the terminal device 100 receives a terminal specific beam and cell specific beam configuration information from the base station 200, the terminal device 100 separates the terminal specific beam (PDSCH beam) transmitted from the base station 200 into a cell specific beam (step S214).

The terminal device 100 that can receive the PDSCH, the DM-RS, the CSI-RS, and the DCI from the base station 200 transmits a reception reply (ACK) to the base station (step S215). Further, the terminal device 100 that can receive the PDSCH, the DM-RS, the CSI-RS, and the DCI from the base station 200 transmits a reception reply (NACK) to the base station (step S215). The control unit 143 transmits a reception reply in step S215 through the antenna unit 110.

The terminal device 100 and the base station 200 execute the above-described series of processes. The base station 200 can hereby generate an appropriate beam for the terminal device 100. Further, the terminal device 100 can receive the beam appropriate for reception from the base station 200. Moreover, if the terminal device 100 receives cell specific beam configuration information from the base station 200, the terminal device 100 can select and stably receive a cell specific beam having a wide range before the optimization of the base station 200 with respect to the PDSCH beam direction.

Regarding Operation Example 3

A case will be considered where the antenna unit 210 includes the 64 antenna elements 211 that are two-dimensionally disposed, and divided into eight sub arrays in total, for example, as illustrated in FIG. 18. One sub array includes the two antenna elements 211 in the horizontal direction and the four antenna elements 211 in the vertical direction.

The eight TXRUs 1 to 8 illustrated in FIG. 18 transmit individual (i.e., eight types of) CSI-RSs (CSI-RS 1 to CSI-RS 8) with respective antenna port 23 to antenna port 30 (on cell specific beams). The base station 200 notifies the terminal device 100 with the CSI reference signal configuration of an antenna port for transmitting a CSI-RS, the position of a resource element at which the CSI-RS is inserted, information on a sub frame into which the CSI-RS is inserted, information of the power ratio between the CSI-RS and a PDSCH, and the like. The terminal device 100 measures the reception power of the CSI-RS of each of the antenna ports 23 to 30 of the base station 200 on the basis of information of which the terminal device 100 is notified by the base station 200. Eight cell specific beams are different in directivity, so that the reception strength at the terminal device 100 differs between the cell specific beams. A cell specific beam for transmitting a PDSCH beam (terminal specific beam) to be assigned to the terminal device 100 is selected from cell specific beams having greater reception strength.

The base station 200 notifies terminal device 100 through RRC signaling whether to report CSI-RS amplitude information.

The terminal device 100 reports CSI-RS amplitude information obtained by measuring the reception power of each CST-RS to the base station 200 as a channel state report. The terminal device 100 may use CSI-RS amplitude information as amplitude information on a CSI-RS whose reception power is greater than or equal to a predefined threshold. The CSI-RS amplitude information may also be, for example, information of RSRP for each CSI-RS or information of RSRQ.

Figure 25:
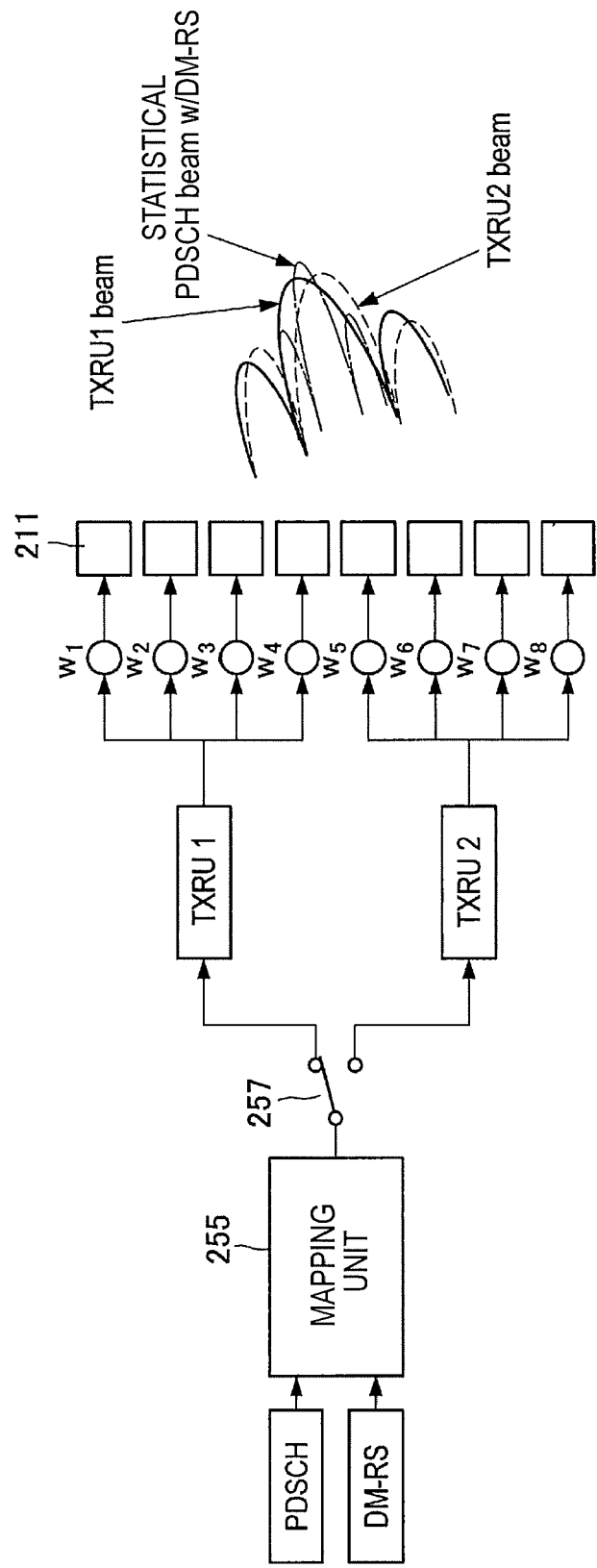
FIG. 25 is an explanatory diagram illustrating an example in which the base station 200 time-divides a PDSCH and assigns the PDSCH to TXRU beams.

The base station 200 selects a cell specific beam appropriate for the terminal device 100, for example, with the control unit 125 on the basis of a channel state report from the terminal device 100, and assigns the PDSCH of the terminal device 100 to a cell specific beam in an appropriate proportion and transmits the PDSCH. FIG. 25 is an explanatory diagram illustrating an example in which the base station 200 time-divides and assigns the PDSCH into TXRU beams.

For example, in a case where a result obtained by the terminal device 100 measuring reception power shows that two of the eight CSI-RSs of cell specific beams are greater than or equal to a threshold, the terminal device 100 reports CSI-RS amplitude information on the two CSI-RSs to the base station 200 as a channel state report. The base station 200 assigns the PDSCH and the DM-RS to be transmitted to the terminal device 100 to the two cell specific beams at the frequency corresponding to the CSI-RS reception levels on the basis of the report from the terminal device 100. The base station 200 may assign more PDSCHs to a cell specific beam having a greater reception level. The base station 200 does not have to notify the terminal device 100 to which cell specific beam a PDSCH is assigned.

The base station 200 uses sharp cell specific beams and selects a number of cell specific beams that the terminal device 100 can receive. The base station 200 can hereby eliminate a process of generating a PMI, a terminal specific weighting matrix, and the like, and easily supply a sharp beam to the terminal device 100.

Figure 26:
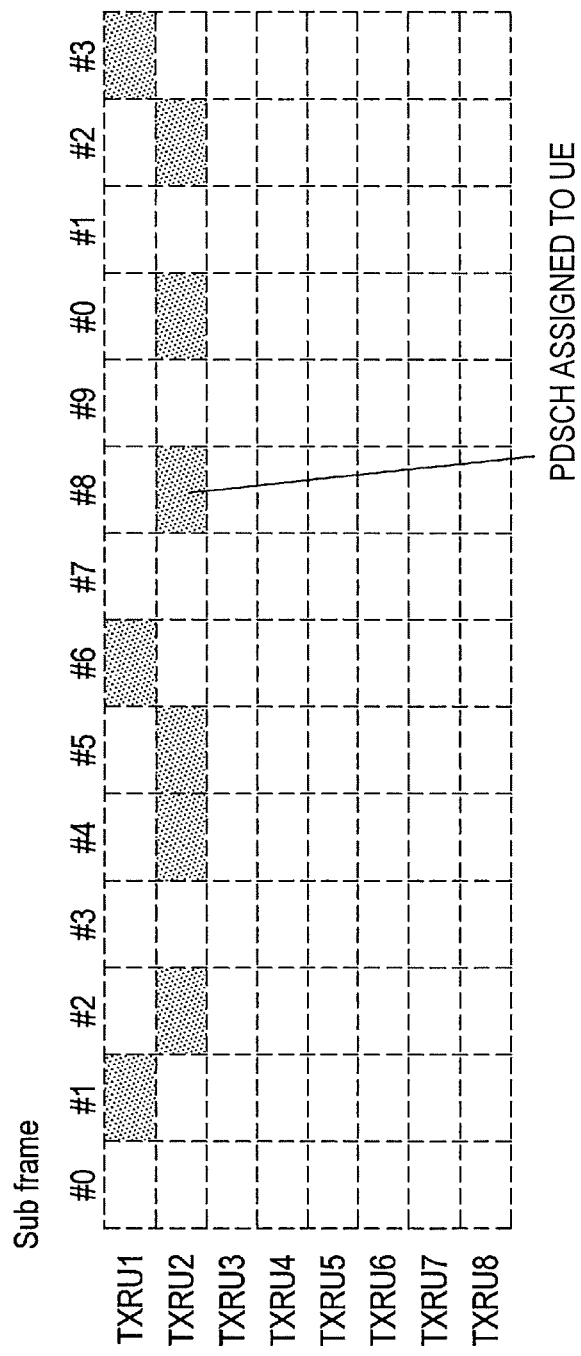
FIG. 26 is an explanatory diagram illustrating an example in which the base station 200 assigns PDSCHs to TXRU beams on a sub frame level.

The base station 200 notifies the terminal device 100 with DCI of an antenna port different from an antenna port for transmitting a cell specific beam as an antenna port for transmitting a PDSCH. The base station 200 may assign a PDSCH to cell specific beams on a sub frame level or a resource block level or a resource element level. The terminal device 100 does not have to learn to which cell specific beam a PDSCH is assigned. Accordingly, no problem arises even if the base station 200 switches PDSCHs at high speed on a resource element level. FIG. 26 is an explanatory diagram illustrating an example in which the base station 200 assigns PDSCHs to TXRU beams on a sub frame level. The base station 200 assigns PDSCHs to TXRU beams in this way on a sub frame level. The base station 200 can hereby eliminate a process of generating a PMI, a terminal specific weighting matrix, and the like, and easily supply a sharp beam to the terminal device 100.

Additionally, one sub array may also be connected to one TXRU, or connected to two or more TXRUs as described above in this operation example 3.

Figure 27:
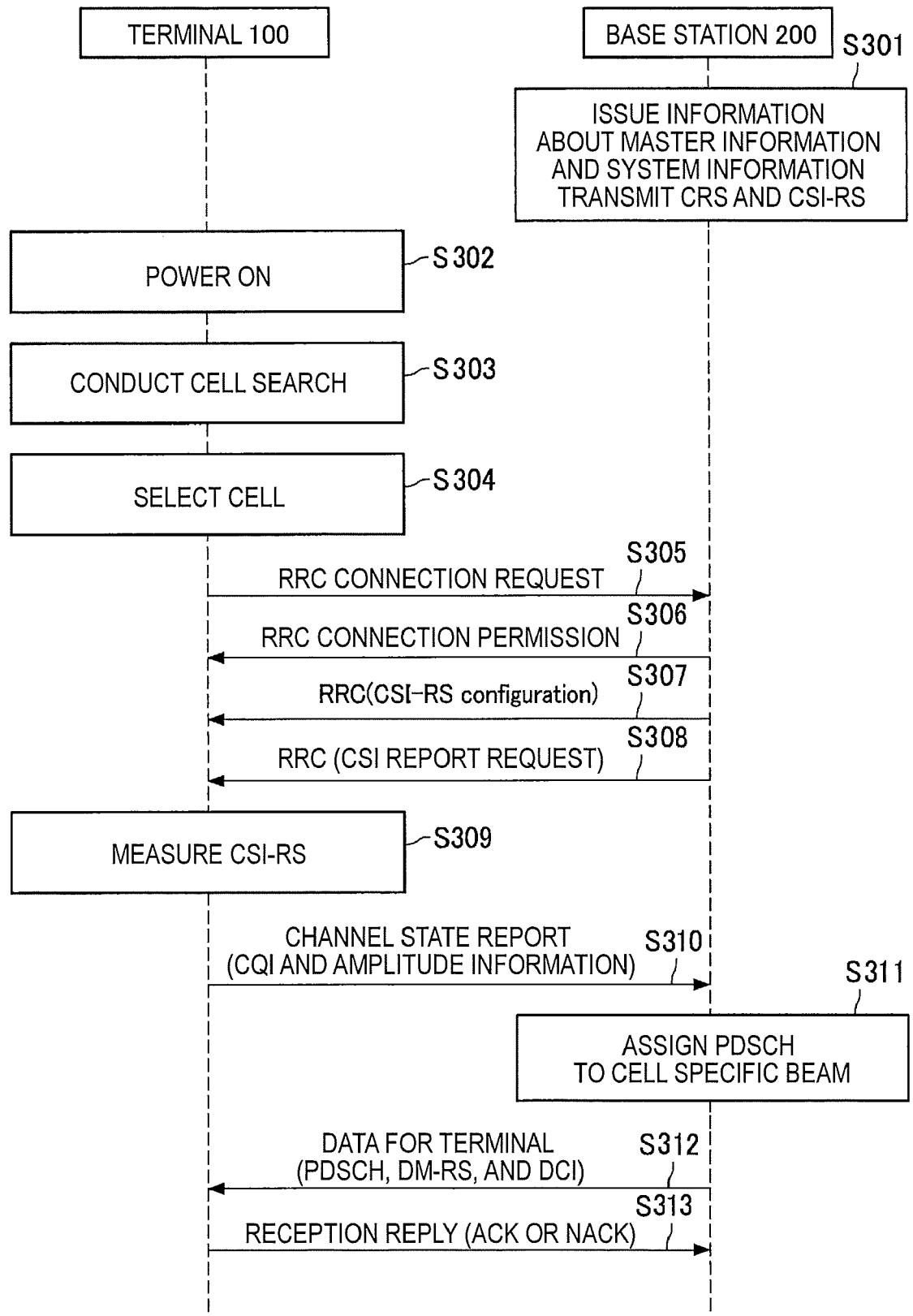
FIG. 27 is a flowchart illustrating operation examples of the terminal device 100 and the base station 200 according to an embodiment of the present disclosure.

FIG. 27 is a flowchart illustrating operation examples of the terminal device 100 and the base station 200 according to an embodiment of the present disclosure. FIG. 27 illustrates an operation example in which the base station 200 assigns a PDSCH to TXRU beams on the basis of a report from the terminal device 100, and transmits data to the terminal device 100. The following uses FIG. 27 to describe operation examples of the terminal device 100 and the base station 200 according to an embodiment of the present disclosure.

The base station 200 transmits, from the antenna unit 210, cell specific reference signals (CRSs) with a resource element decided on the basis of physical layer cell IDs (PCIs) and the number of transmitting antennas in all the sub frames (step S301). The base station 200 uses different antenna ports to transmit CSI-RSs through cell specific weighting matrices for each TXRUs. The base station 200 transmits a CSI-RS at the predefined position of a resource element in a predefined sub frame.

If the terminal device 100 is powered on (step S302), the terminal device 100 conducts a cell search with a frequency channel having high priority (step S303). The terminal device 100 detects a first synchronization signal (PSS) and a second synchronization signal (SSS), and detects a physical layer cell ID (PCI) and frame timing. The terminal device 100 can decode a master information block (MIB) and a system information block (SIB), learn, from the already detected PCI and the number of transmitting antennas included in the base station 200, the position of a resource element into which a cell specific reference signal (CRS) is inserted, and measure the reception strength thereof. The terminal device 100 measures the strength of nearby CRSs with the control unit 143, and selects the optimum cell (step S304).

The terminal device 100 that selects the optimum cell sends an RRC connection request to the base station 200 (step S305). The control unit 143 transmits an RRC connection request in step S305 through the antenna unit 110. The base station 200 that receives the RRC connection request sends an RRC connection permission to the terminal device 100 (step S306). The control unit 253 transmits an RRC connection permission in step S306 through the antenna unit 210. If the base station 200 sends an RRC connection permission to the terminal device 100 that transmits an RRC connection request, the terminal device 100 and the base station 200 enter an RRC connection state (RRC Connected).

Next, the base station 200 notifies the terminal device 100 in the RRC connection state through RRC signaling of information on an antenna port with which a CSI-RS is transmitted, the position of information on a resource element into which the CSI-RS is inserted, and a sub frame into which the CSI-RS is inserted (step S307). The control unit 253 notifies the terminal device 100 in step S307 through the antenna unit 210. Further, the base station 200 notifies the terminal device 100 through RRC signaling whether to report an RI, a PMI, and CSI-RS amplitude information for the CSI-RS (step S308). The control unit 253 notifies the terminal device 100 in step S308 through the antenna unit 210.

The terminal device 100 that receives the notification from the base station 200 measures a CSI-RS greater than or equal to a predefined reception strength threshold (step S309). The control unit 143 performs the measurement of step S309. The terminal device 100 transmits, to the base station, a report (channel state report) of CSI-RS amplitude information for a CSI-RS in accordance with a request from the base station 200 (step S310). The control unit 143 transmits a channel state report in step S310 through the antenna unit 110.

The base station 200 that receives the channel state report from the terminal device 100 selects the optimum TXRU for the terminal device 100 with the control unit 253 in accordance with the report from the terminal device 100. The base station 200 then notifies the terminal device 100 with DCI of an antenna port for transmitting a PDSCH and a DM-RS assigned to the terminal, disposes the PDSCH and the DM-RS in a resource block assigned to the terminal device 100, assigns the resource block to a cell specific beam in accordance with a report of the CSI-RS amplitude information, and transmits the resource block (step S311). The control unit 253 transmits in step S311 through the antenna unit 210.

The terminal device 100 that can receive the PDSCH, the DM-RS, and the DCI from the base station 200 transmits a reception reply (ACK) to the base station (step S312).

Further, the terminal device 100 that fails to receive the PDSCH, the DM-RS, and the DCI from the base station 200 transmits a reception reply (NACK) to the base station (step S312). The control unit 143 transmits a reception reply in step S312 through the antenna unit 110.

The terminal device 100 and the base station 200 execute the above-described series of processes. The base station 200 can hereby generate an appropriate beam for the terminal device 100. Further, the terminal device 100 can receive the beam appropriate for reception from the base station 200. Moreover, the base station 200 assigns PDSCHs to TXRU beams. The base station 200 can hereby eliminate a process of generating a PMI, a terminal specific weighting matrix, and the like, and easily supply a sharp beam to the terminal device 100.

The operation examples 1 to 3 have been described above. Next, a multiplexing method of a user in each operation example will be described.

The base station 200 can multiplex users, for example, by assigning an individual resource block to each user. For example, 100 resource blocks are disposed in a component carrier of 20 MHz in the frequency direction, so that it is possible to concurrently multiplex 100 users in one sub frame, and it is also possible to multiplex users in the time direction in units of sub frames.

The base station 200 can multiplex users by using different terminal specific weighting matrices for the terminal devices 100 positioned at the angles of different directions in the operation example 1 and the operation example 2.

For example, in a case where sub arrays and TXRUs are configured as illustrated in FIG. 12, the base station 200 assigns a terminal specific weighting matrix including 16 weighting factors for each user, and generates a PDSCH beam through cell specific weighting matrices and the terminal specific weighting matrix as illustrated in FIG. 15.

Figure 28:
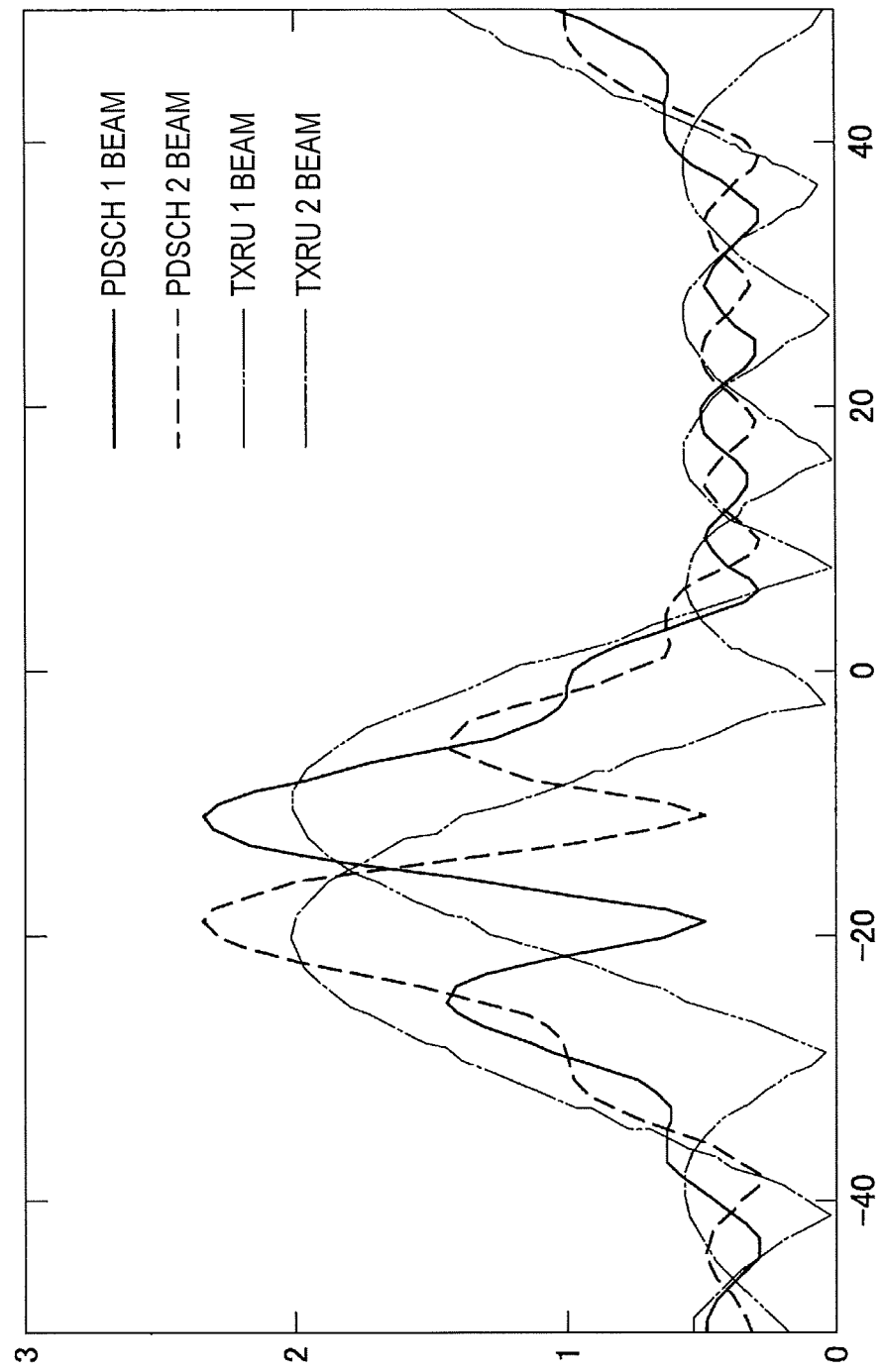
FIG. 28 is an explanatory diagram illustrating examples of two PDSCH beams.

FIG. 28 is an explanatory diagram illustrating examples of two PDSCH beams in a case where sub arrays and TXRUs are configured as illustrated in FIG. 12. FIG. 28 illustrates examples of PDSCH beams in a case where the beam direction of a TXRU 1 beam in the vertical direction is set at −10° with the cell specific weighting factors $w_1$ to $w_4$ of the TXRU 1, and the beam direction of a TXRU 2 beam in the vertical direction is set at −20° with the cell specific weighting factors $w_5$ to $w_8$ of the TXRU 2. Additionally, FIG. 28 also illustrates examples of beams of the TXRU 1 and the TXRU 2 in a case where no weights are imparted. Terminal specific weighting factors applied to PDSCHs transmitted to a user will be set as follows.

$$\begin{vmatrix} w_{1,1} & w_{1,2} & w_{1,3} & w_{1,4} & w_{1,5} & w_{1,6} & w_{1,7} & w_{1,8} \\ w_{2,1} & w_{2,2} & w_{2,3} & w_{2,4} & w_{2,5} & w_{2,6} & w_{2,7} & w_{2,8} \end{vmatrix}$$ [Math. 5]

The base station 200 adjusts weights ($w_{1,m}$ and $w_{2,m}$) of these terminal specific weighting factors in the vertical direction, and classifies the directivity of PDSCH 1 beams transmitted to users at approximately −10° in the vertical direction and the directivity of PDSCH 2 beams transmitted to users at approximately −20° in the vertical direction. The base station 200 can decrease interference between the two PDSCH beams by classifying the directivity, assign the same resource block, and further multiplex users.

Figure 29:
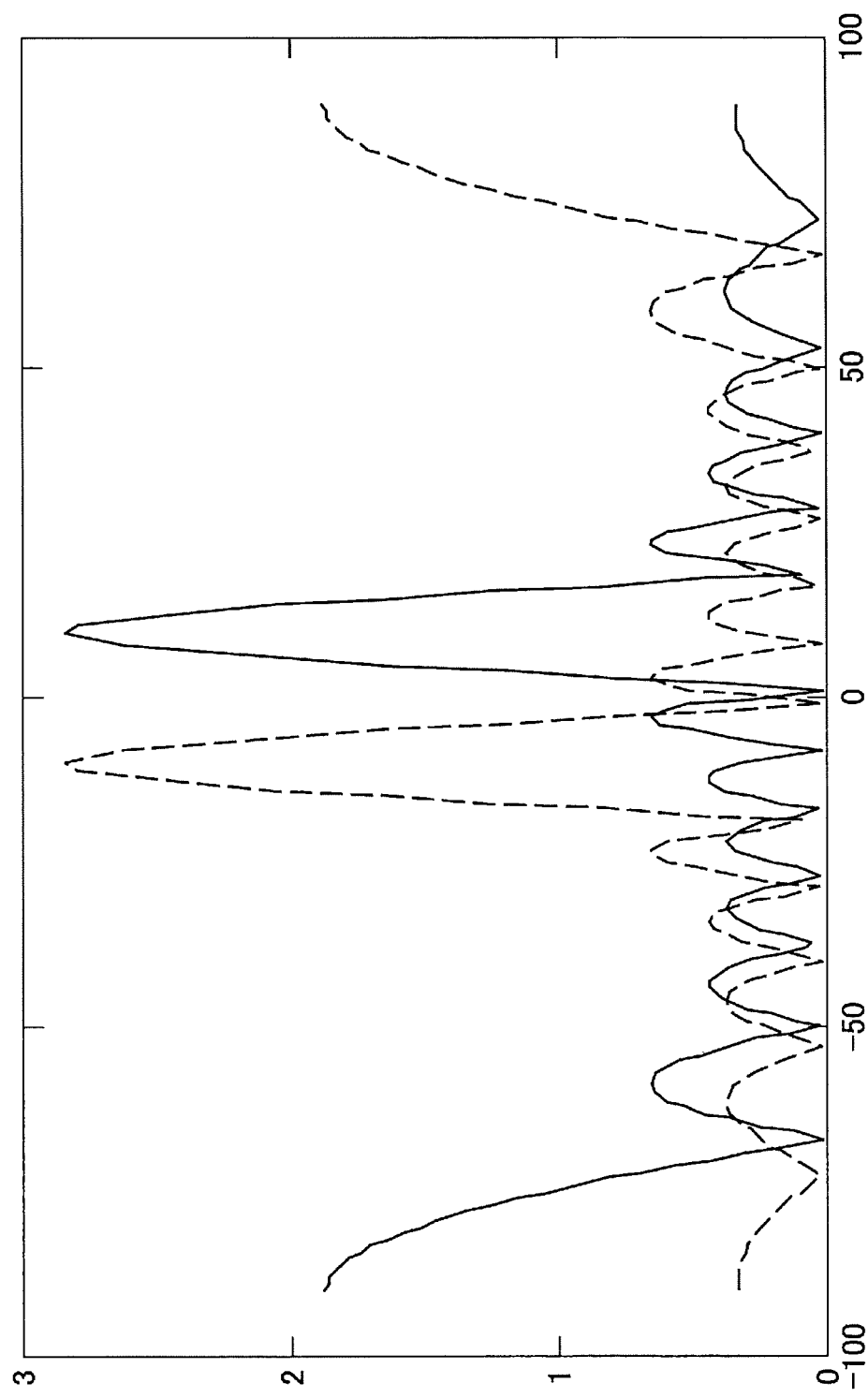
FIG. 29 is an explanatory diagram illustrating an example of a beam in the horizontal direction.

FIG. 29 is an explanatory diagram illustrating an example of a beam in the horizontal direction in a case where sub arrays and TXRUs are configured as illustrated in FIG. 12. The base station 200 adjusts weights ($w_{n,1}$ to $w_{n,8}$) of the terminal specific weighting factors in the horizontal direction, and classifies the directivity of PDSCH beams (dashed lines in FIG. 29) transmitted to users at approximately −10° in the horizontal direction and the directivity of PDSCH beams (solid lines in FIG. 29) transmitted to users at approximately 10° in the horizontal direction. The base station 200 can decrease interference between the two PDSCH beams by classifying the directivity, assign the same resource block, and further multiplex users.

The base station 200 can multiplex users by assigning and using TXRU beams pointing at the angles of different directions between terminals positioned at the angles of different directions in the operation example 3.

For example, in a case where sub arrays and TXRUs are configured as illustrated in FIG. 18, eight TXRU beams use different weighting matrices W and beams in different directions are generated.

For example, it is assumed that a UE 1 can receive the TXRU 1 beam and the TXRU 2 beam, a UE 2 can receive the TXRU 2 beam and a TXRU 3 beam, a UE 3 can receive a TXRU 5 beam and a TXRU 6 beam, a UE 4 can receive a TXRU 4 beam, the TXRU 5 beam, and the TXRU 6 beam, and a UE 5 can receive a TXRU 7 beam and a TXRU 8 beam.

Figure 30:
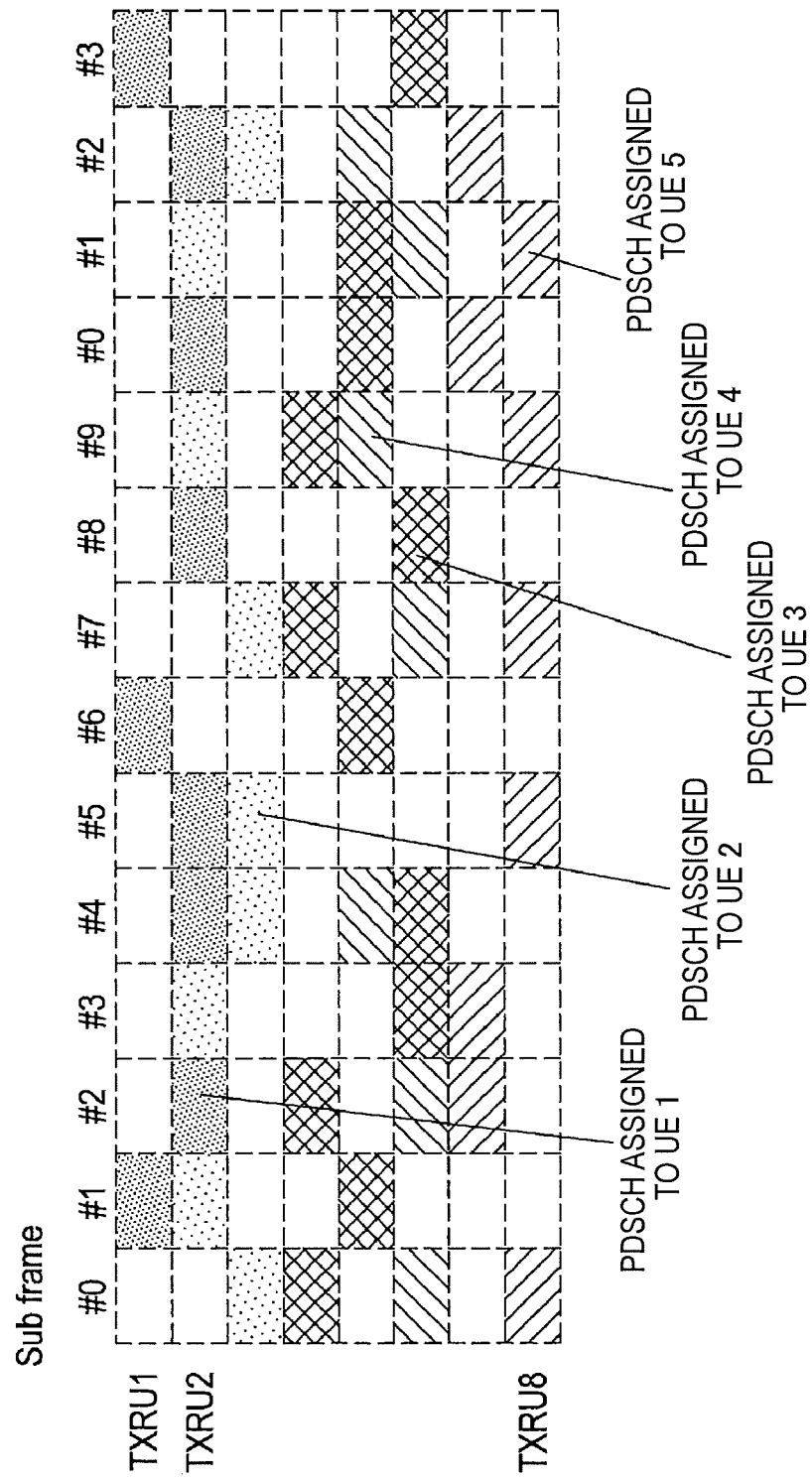
FIG. 30 is an explanatory diagram illustrating an example in which the base station 200 assigns PDSCHs of users to different TXRU beams on a sub frame level.

FIG. 30 is an explanatory diagram illustrating an example in which the base station 200 assigns PDSCHs of users to different TXRU beams on a sub frame level. As illustrated in FIG. 30, the base station 200 assigns PDSCHs for UEs in a manner that TXRU beams receivable for each sub frame do not overlap. The base station 200 can decrease interference between UEs and assign the same resource block to UEs by assigning PDSCHs for UEs in a manner that TXRU beams receivable for each sub frame do not overlap. The base station 200 can also multiplex users.

2. Application Examples

The technology of the present disclosure can be applied to various products. For example, the control entity 300 may be realized as a server of any type such as a tower server, a rack server, a blade server, or the like. In addition, the control entity 300 may be a control module mounted in a server (e.g., an integrated circuit module configured in one die or a card or a blade inserted into a slot of a blade server).

Further, the base station 200 may be realized as any type of evolved node B (eNB), for example, a macro eNB, a small eNB, or the like. A small eNB may be an eNB that covers a smaller cell than a macro cell, such as a pico eNB, a micro eNB, or a home (femto) eNB. Alternatively, the base station 200 may be realized as another type of base station such as a node B or a base transceiver station (BTS). The base station 200 may include a main body that controls radio communication (also referred to as a base station device) and one or more remote radio heads (RRHs) disposed in a different place from the main body. In addition, various types of terminals to be described below may operate as the base station 200 by temporarily or semi-permanently executing the base station function.

In addition, the terminal device 100 may be realized as, for example, a mobile terminal such as a smartphone, a tablet personal computer (PC), a notebook PC, a portable game terminal, a portable/dongle type mobile router, or a digital camera, or an in-vehicle terminal such as a car navigation device. In addition, the terminal device 100 may be realized as a terminal that performs machine-to-machine (M2M) communication (also referred to as a machine type communication (MTC) terminal). Furthermore, the terminal device 100 may be a wireless communication module mounted in such a terminal (for example, an integrated circuit module configured in one die).

2-1. Application Example with Regard to Control Entity

Figure 31:
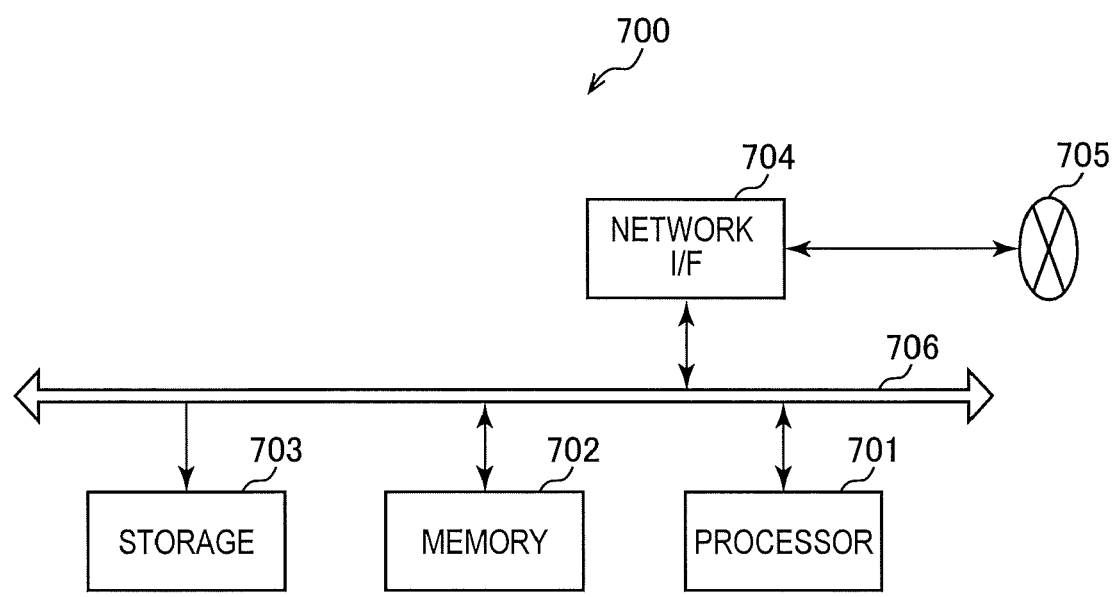
FIG. 31 is a block diagram illustrating an example of a schematic configuration of a server 700 to which the technology of the present disclosure can be applied.

FIG. 31 is a block diagram illustrating an example of a schematic configuration of a server 700 to which the technology of the present disclosure may be applied. The server 700 includes a processor 701, a memory 702, a storage 703, a network interface 704, and a bus 706.

The processor 701 may be, for example, a central processing unit (CPU) or a digital signal processor (DSP) and controls various functions of the server 700. The memory 702 includes a random access memory (RAM) and a read only memory (ROM) and stores programs executed by the processor 701 and data. The storage 703 can include a storage medium such as a semiconductor memory or a hard disk.

The network interface 704 is a wired communication interface for connecting the server 700 to a wired communication network 705. The wired communication network 705 may be a core network such as an evolved packet core (EPC) or a packet data network (PDN) such as the Internet.

The bus 706 connects the processor 701, the memory 702, the storage 703, and the network interface 704 to each other. The bus 706 may include two or more buses that operate at different speeds (e.g., a high-speed bus and a low-speed bus).

In the server 700 illustrated in FIG. 31, one or more constituent elements included in the processing unit 330 described with reference to FIG. 13 (the information acquisition unit 331 and/or the control unit 333) may be implemented by the processor 701. As an example, a program for causing a processor to function as the one or more constituent elements (i.e., a program for causing a processor to execute operations of the one or more constituent elements) may be installed in the server 700 and the processor 701 may execute the program. As another example, a module including the processor 701 and the memory 702 may be mounted in the server 700 and the one or more constituent elements may be implemented by the module. In this case, the module may store a program for causing a processor to function as the one or more constituent elements in the memory 702 and the program may be executed by the processor 701. The server 700 or the module may be provided as devices having the above-described one or more constituent elements as described above, or the program for causing a processor to function as the one or more constituent elements may be provided. In addition, a readable recording medium in which the program is recorded may be provided.

2-2. Application Example with Regard to Base Station

First Application Example

Figure 32:
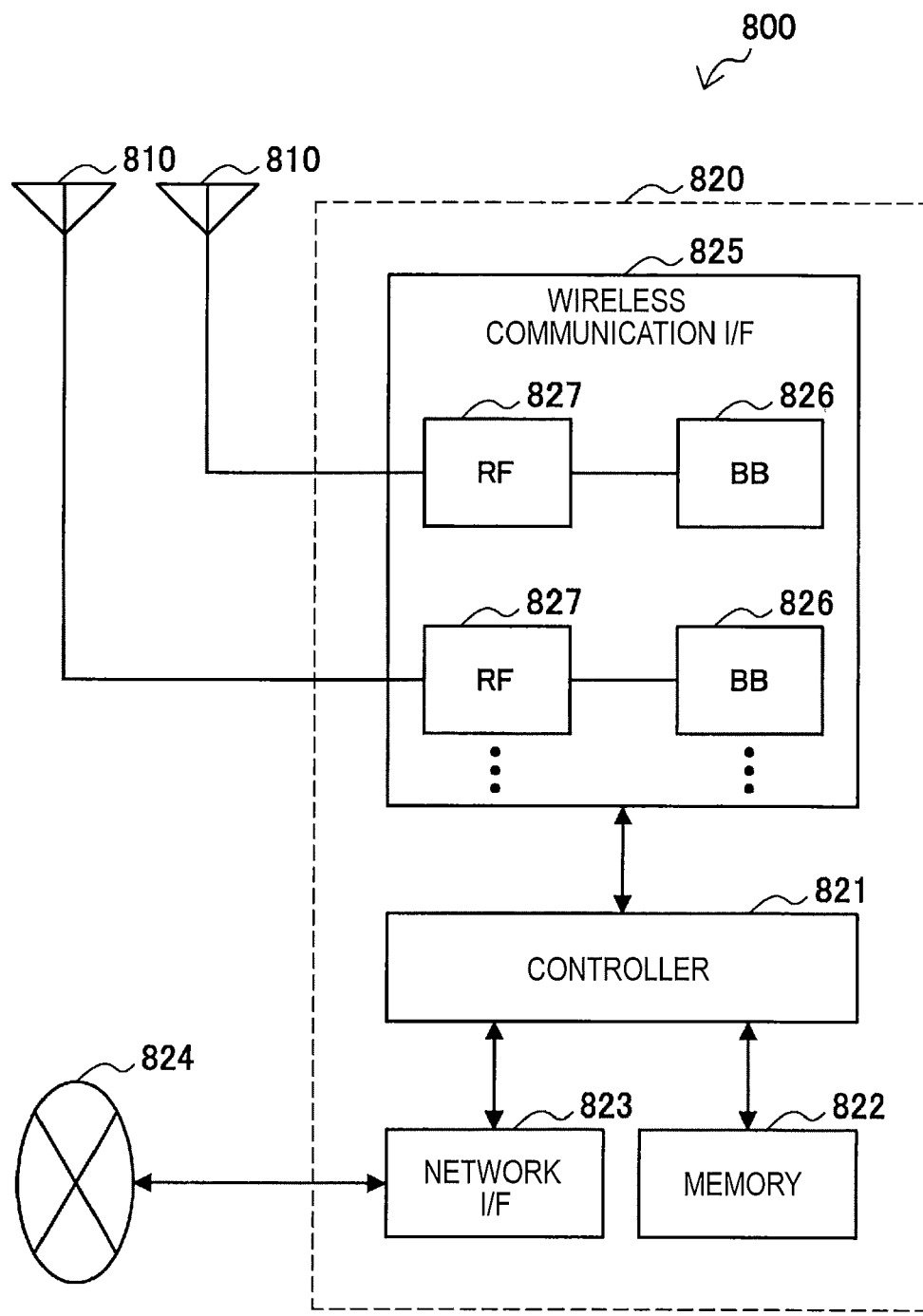
FIG. 32 is a block diagram illustrating a first example of a schematic configuration of an eNB to which the technology of the present disclosure can be applied.

FIG. 32 is a block diagram illustrating a first example of a schematic configuration of an eNB to which the technology of the present disclosure may be applied. An eNB 800 includes one or more antennas 810 and a base station device 820. Each antenna 810 and the base station device 820 may be connected to each other via an RF cable.

Each of the antennas 810 includes a single or multiple antenna elements (such as multiple antenna elements included in an MIMO antenna), and is used for the base station device 820 to transmit and receive radio signals. The eNB 800 may include the multiple antennas 810, as illustrated in FIG. 32. For example, the multiple antennas 810 may be compatible with multiple frequency bands used by the eNB 800. Although FIG. 32 illustrates the example in which the eNB 800 includes the multiple antennas 810, the eNB 800 may also include a single antenna 810.

The base station device 820 includes a controller 821, a memory 822, a network interface 823, and a wireless communication interface 825.

The controller 821 may be, for example, a CPU or a DSP, and operates various functions of a higher layer of the base station device 820. For example, the controller 821 generates a data packet from data in signals processed by the wireless communication interface 825, and transfers the generated packet via the network interface 823. The controller 821 may bundle data from multiple base band processors to generate the bundled packet, and transfer the generated bundled packet. The controller 821 may have logical functions of performing control such as radio resource control, radio bearer control, mobility management, admission control, and scheduling. The control may be performed in corporation with an eNB or a core network node in the vicinity. The memory 822 includes RAM and ROM, and stores a program that is executed by the controller 821, and various types of control data (such as a terminal list, transmission power data, and scheduling data).

The network interface 823 is a communication interface for connecting the base station device 820 to a core network 824. The controller 821 may communicate with a core network node or another eNB via the network interface 823. In this case, the eNB 800 may be connected to a core network node or another eNB through a logical interface (e.g. S1 interface or X2 interface). The network interface 823 may also be a wired communication interface or a wireless communication interface for wireless backhaul. If the network interface 823 is a wireless communication interface, the network interface 823 may use a higher frequency band for wireless communication than a frequency band used by the wireless communication interface 825.

The wireless communication interface 825 supports any cellular communication scheme such as Long Term Evolution (LTE) and LTE-Advanced, and provides radio connection to a terminal positioned in a cell of the eNB 800 via the antenna 810. The wireless communication interface 825 may typically include, for example, a baseband (BB) processor 826 and an RF circuit 827. The BB processor 826 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 826 may have a part or all of the above-described logical functions instead of the controller 821. The BB processor 826 may be a memory that stores a communication control program, or a module that includes a processor and a related circuit configured to execute the program. Updating the program may allow the functions of the BB processor 826 to be changed. The module may be a card or a blade that is inserted into a slot of the base station device 820. Alternatively, the module may also be a chip that is mounted on the card or the blade. Meanwhile, the RF circuit 827 may include, for example, a mixer, a filter, and an amplifier, and transmits and receives radio signals via the antenna 810.

The wireless communication interface 825 may include the multiple BB processors 826, as illustrated in FIG. 32. For example, the multiple BB processors 826 may be compatible with multiple frequency bands used by the eNB 800. The wireless communication interface 825 may include the multiple RF circuits 827, as illustrated in FIG. 32. For example, the multiple RF circuits 827 may be compatible with multiple antenna elements. Although FIG. 32 illustrates the example in which the wireless communication interface 825 includes the multiple BB processors 826 and the multiple RF circuits 827, the wireless communication interface 825 may also include a single BB processor 826 or a single RF circuit 827.

Second Application Example

Figure 33:
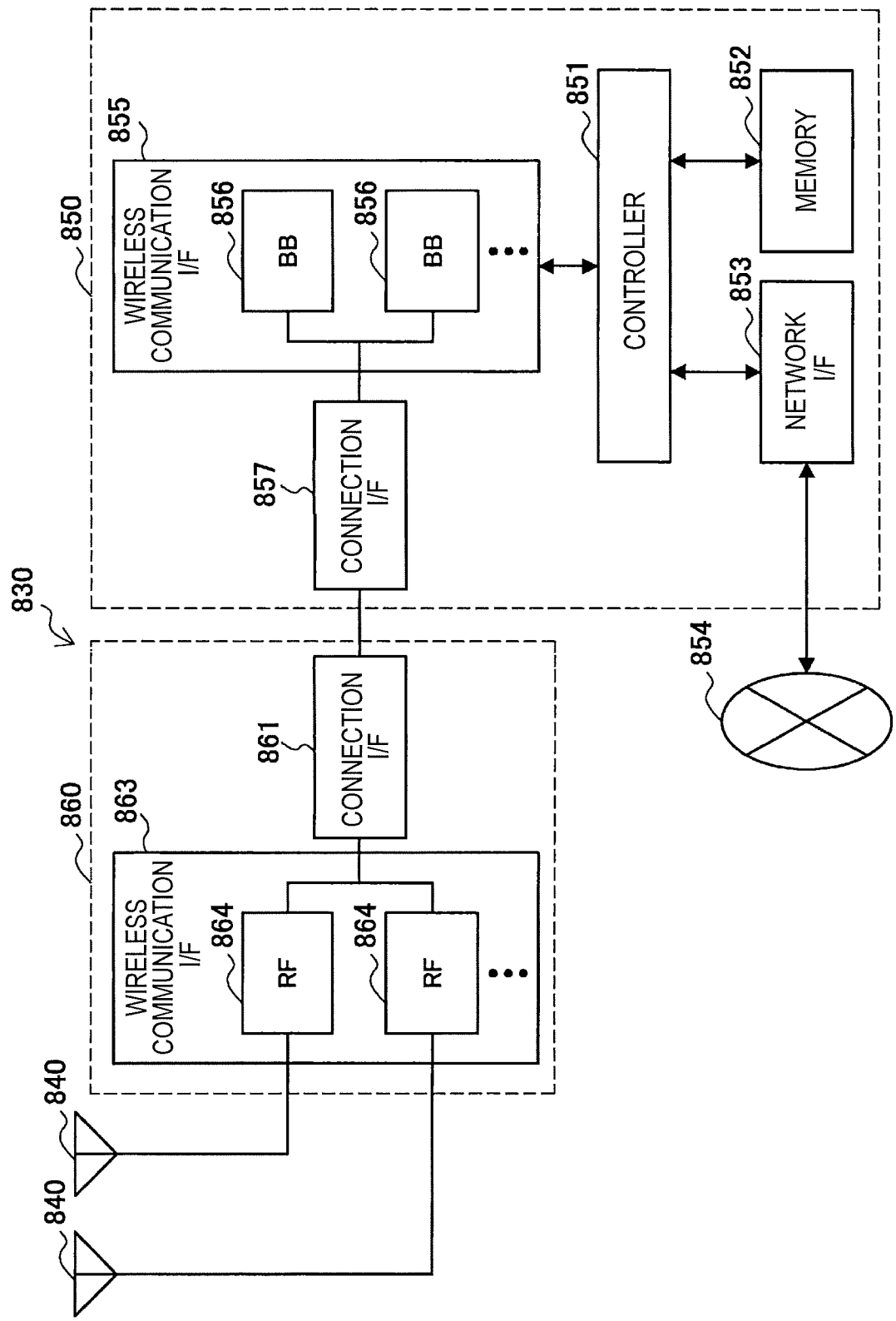
FIG. 33 is a block diagram illustrating a second example of the schematic configuration of the eNB to which the technology of the present disclosure can be applied.

FIG. 33 is a block diagram illustrating a second example of a schematic configuration of an eNB to which the technology of the present disclosure may be applied. An eNB 830 includes one or more antennas 840, a base station device 850, and an RRH 860. Each antenna 840 and the RRH 860 may be connected to each other via an RF cable. The base station device 850 and the RRH 860 may be connected to each other via a high speed line such as an optical fiber cable.

Each of the antennas 840 includes a single or multiple antenna elements (such as multiple antenna elements included in an MIMO antenna), and is used for the RRH 860 to transmit and receive radio signals. The eNB 830 may include the multiple antennas 840, as illustrated in FIG. 33. For example, the multiple antennas 840 may be compatible with multiple frequency bands used by the eNB 830. Although FIG. 33 illustrates the example in which the eNB 830 includes the multiple antennas 840, the eNB 830 may also include a single antenna 840.

The base station device 850 includes a controller 851, a memory 852, a network interface 853, a wireless communication interface 855, and a connection interface 857. The controller 851, the memory 852, and the network interface 853 are the same as the controller 821, the memory 822, and the network interface 823 described with reference to FIG. 32.

The wireless communication interface 855 supports any cellular communication scheme such as LTE and LTE-Advanced, and provides wireless communication to a terminal positioned in a sector corresponding to the RRH 860 via the RRH 860 and the antenna 840. The wireless communication interface 855 may typically include, for example, a BB processor 856. The BB processor 856 is the same as the BB processor 826 described with reference to FIG. 32, except the BB processor 856 is connected to the RF circuit 864 of the RRH 860 via the connection interface 857. The wireless communication interface 855 may include the multiple BB processors 856, as illustrated in FIG. 33. For example, the multiple BB processors 856 may be compatible with multiple frequency bands used by the eNB 830. Although FIG. 33 illustrates the example in which the wireless communication interface 855 includes the multiple BB processors 856, the wireless communication interface 855 may also include a single BB processor 856.

The connection interface 857 is an interface for connecting the base station device 850 (wireless communication interface 855) to the RRH 860. The connection interface 857 may also be a communication module for communication in the above-described high speed line that connects the base station device 850 (wireless communication interface 855) to the RRH 860.

The RRH 860 includes a connection interface 861 and a wireless communication interface 863.

The connection interface 861 is an interface for connecting the RRH 860 (wireless communication interface 863) to the base station device 850. The connection interface 861 may also be a communication module for communication in the above-described high speed line.

The wireless communication interface 863 transmits and receives radio signals via the antenna 840. The wireless communication interface 863 may typically include, for example, the RF circuit 864. The RF circuit 864 may include, for example, a mixer, a filter, and an amplifier, and transmits and receives radio signals via the antenna 840. The wireless communication interface 863 may include multiple RF circuits 864, as illustrated in FIG. 33. For example, the multiple RF circuits 864 may support multiple antenna elements. Although FIG. 33 illustrates the example in which the wireless communication interface 863 includes the multiple RF circuits 864, the wireless communication interface 863 may also include a single RF circuit 864.

In the eNB 800 and the eNB 830 shown in FIGS. 32 and 33, one or more constituent elements included in the processing unit 250 (the information acquisition unit 251 and/or the control unit 253) described with reference to FIG. 11 may be implemented by the wireless communication interface 855 and/or the wireless communication interface 863. Alternatively, at least some of these constituent elements may be implemented by the controller 851. As an example, a module which includes a part (for example, the BB processor 856) or all of the wireless communication interface 855 and/or the controller 851 may be mounted in eNB 830, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the eNB 830, and the wireless communication interface 855 (for example, the BB processor 856) and/or the controller 851 may execute the program. As described above, the eNB 830, the base station device 850, or the module may be provided as a device which includes the one or more constituent elements, and the program for causing the processor to function as the one or more constituent elements may be provided. In addition, a readable recording medium in which the program is recorded may be provided.

In addition, in the eNB 830 shown in FIG. 33, the wireless communication unit 220 described, for example, with reference to FIG. 11 may be implemented by the wireless communication interface 863 (for example, the RF circuit 864). Moreover, the antenna unit 210 may be implemented by the antenna 840. Further, the network communication unit 230 may be implemented by the controller 851 and/or the network interface 853.

2-3. Application Example with Regard to Terminal Device

First Application Example

Figure 34:
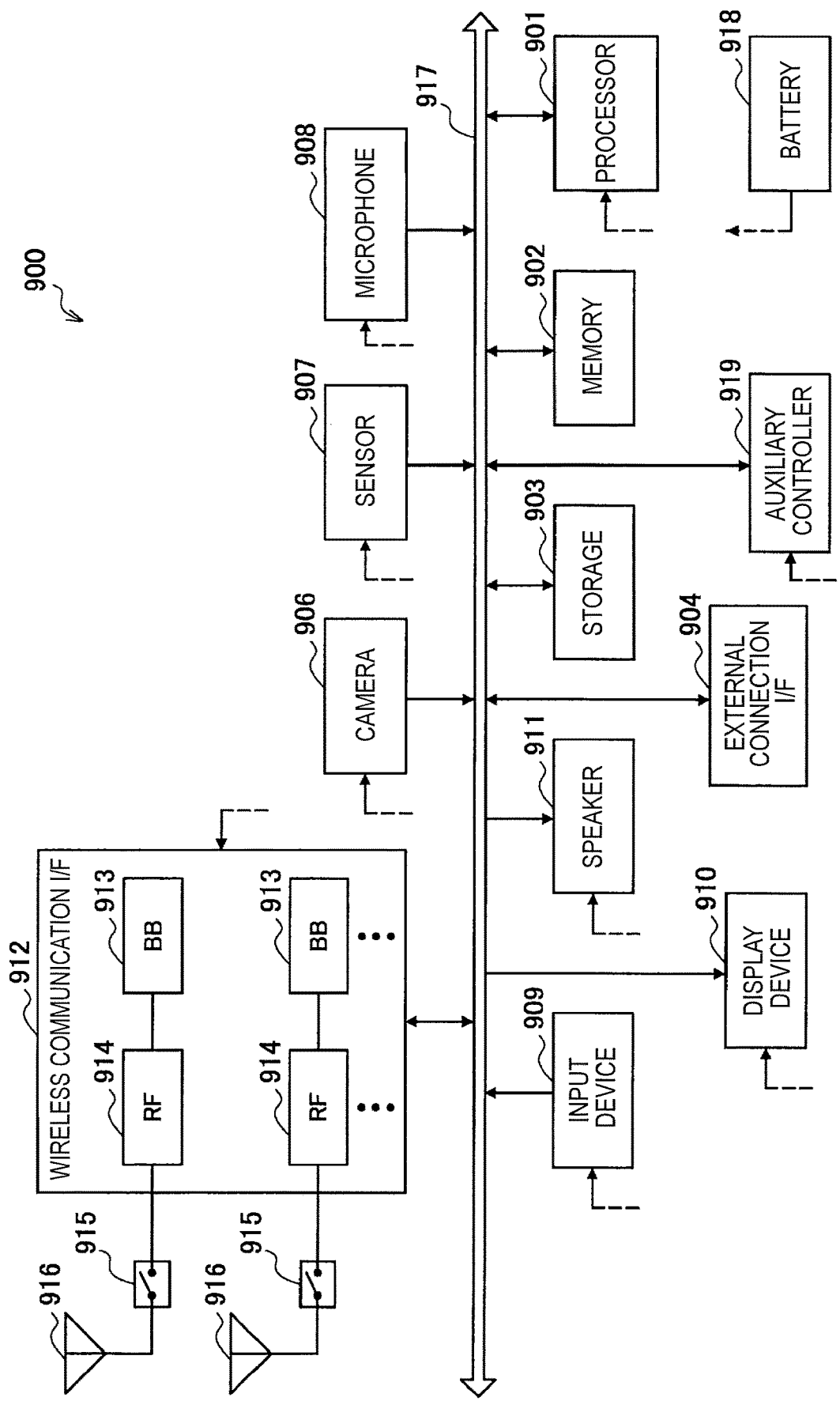
FIG. 34 is a block diagram illustrating an example of a schematic configuration of a smartphone 900 to which the technology of the present disclosure can be applied.

FIG. 34 is a block diagram illustrating an example of a schematic configuration of a smartphone 900 to which the technology of the present disclosure may be applied. The smartphone 900 includes a processor 901, a memory 902, a storage 903, an external connection interface 904, a camera 906, a sensor 907, a microphone 908, an input device 909, a display device 910, a speaker 911, a wireless communication interface 912, one or more antenna switches 915, one or more antennas 916, a bus 917, a battery 918, and an auxiliary controller 919.

The processor 901 may be, for example, a CPU or a system on a chip (SoC), and controls functions of an application layer and another layer of the smartphone 900. The memory 902 includes RAM and ROM, and stores a program that is executed by the processor 901, and data. The storage 903 may include a storage medium such as a semiconductor memory and a hard disk. The external connection interface 904 is an interface for connecting an external device such as a memory card and a universal serial bus (USB) device to the smartphone 900.

The camera 906 includes an image sensor such as a charge coupled device (CCD) and a complementary metal oxide semiconductor (CMOS), and generates a captured image. The sensor 907 may include a group of sensors such as a measurement sensor, a gyro sensor, a geomagnetic sensor, and an acceleration sensor. The microphone 908 converts sounds that are input to the smartphone 900 to audio signals. The input device 909 includes, for example, a touch sensor configured to detect touch onto a screen of the display device 910, a keypad, a keyboard, a button, or a switch, and receives an operation or an information input from a user. The display device 910 includes a screen such as a liquid crystal display (LCD) and an organic light-emitting diode (OLED) display, and displays an output image of the smartphone 900. The speaker 911 converts audio signals that are output from the smartphone 900 to sounds.

The wireless communication interface 912 supports any cellular communication scheme such as LTE and LTE-Advanced, and performs wireless communication. The wireless communication interface 912 may typically include, for example, a BB processor 913 and an RF circuit 914. The BB processor 913 may perform, for example, encoding/decoding, modulating/demodulating, and multiplexing/demultiplexing, and performs various types of signal processing for wireless communication. Meanwhile, the RF circuit 914 may include, for example, a mixer, a filter, and an amplifier, and transmits and receives radio signals via the antenna 916. The wireless communication interface 912 may also be a one chip module that has the BB processor 913 and the RF circuit 914 integrated thereon. The wireless communication interface 912 may include the multiple BB processors 913 and the multiple RF circuits 914, as illustrated in FIG. 34. Although FIG. 34 illustrates the example in which the wireless communication interface 912 includes the multiple BB processors 913 and the multiple RF circuits 914, the wireless communication interface 912 may also include a single BB processor 913 or a single RF circuit 914.

Furthermore, in addition to a cellular communication scheme, the wireless communication interface 912 may support another type of wireless communication scheme such as a short-distance wireless communication scheme, a near field communication scheme, and a wireless local area network (LAN) scheme. In that case, the wireless communication interface 912 may include the BB processor 913 and the RF circuit 914 for each wireless communication scheme.

Each of the antenna switches 915 switches connection destinations of the antennas 916 among multiple circuits (such as circuits for different wireless communication schemes) included in the wireless communication interface 912.

Each of the antennas 916 includes a single or multiple antenna elements (such as multiple antenna elements included in an MIMO antenna), and is used for the wireless communication interface 912 to transmit and receive radio signals. The smartphone 900 may include the multiple antennas 916, as illustrated in FIG. 34. Although FIG. 34 illustrates the example in which the smartphone 900 includes the multiple antennas 916, the smartphone 900 may also include a single antenna 916.

Furthermore, the smartphone 900 may include the antenna 916 for each wireless communication scheme. In that case, the antenna switches 915 may be omitted from the configuration of the smartphone 900.

The bus 917 connects the processor 901, the memory 902, the storage 903, the external connection interface 904, the camera 906, the sensor 907, the microphone 908, the input device 909, the display device 910, the speaker 911, the wireless communication interface 912, and the auxiliary controller 919 to each other. The battery 918 supplies power to blocks of the smartphone 900 illustrated in FIG. 34 via feeder lines, which are partially shown as dashed lines in the figure. The auxiliary controller 919 operates a minimum necessary function of the smartphone 900, for example, in a sleep mode.

In the smartphone 900 shown in FIG. 34, one or more constituent elements included in the processing unit 140 (the information acquisition unit 141 and/or the control unit 143) described with reference to FIG. 10 may be implemented by the wireless communication interface 912. Alternatively, at least some of these constituent elements may be implemented by the processor 901 or the auxiliary controller 919. As an example, a module which includes a part (for example, the BB processor 913) or all of the wireless communication interface 912, the processor 901 and/or the auxiliary controller 919 may be mounted in the smartphone 900, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the smartphone 900, and the wireless communication interface 912 (for example, the BB processor 913), the processor 901 and/or the auxiliary controller 919 may execute the program. As described above, the smartphone 900 or the module may be provided as a device which includes the one or more constituent elements, and the program for causing the processor to function as the one or more constituent elements may be provided. In addition, a readable recording medium in which the program is recorded may be provided.

In addition, in the smartphone 900 shown in FIG. 34, the wireless communication unit 120 described, for example, with reference to FIG. 10 may be implemented by the wireless communication interface 912 (for example, the RF circuit 914). Moreover, the antenna unit 110 may be implemented by the antenna 916.

Second Application Example

Figure 35:
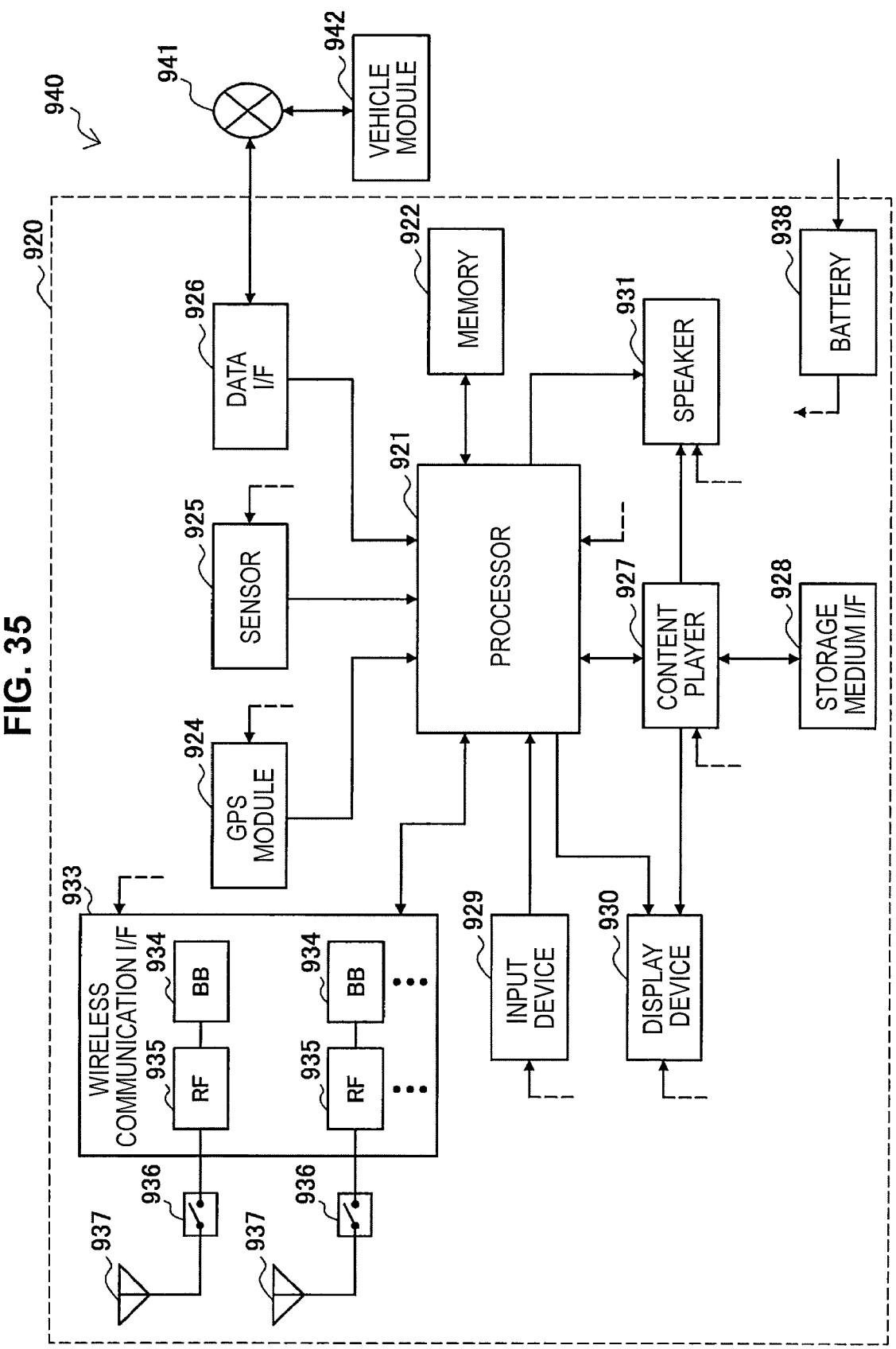
FIG. 35 is a block diagram illustrating an example of a schematic configuration of a car navigation device 920 to which the technology of the present disclosure can be applied.

FIG. 35 is a block diagram illustrating an example of a schematic configuration of a car navigation device 920 to which the technology of the present disclosure may be applied. The car navigation device 920 includes a processor 921, a memory 922, a global positioning system (GPS)

module 924, a sensor 925, a data interface 926, a content player 927, a storage medium interface 928, an input device 929, a display device 930, a speaker 931, a wireless communication interface 933, one or more antenna switches 936, one or more antennas 937, and a battery 938.

The processor 921 may be, for example, a CPU or a SoC, and controls a navigation function and another function of the car navigation device 920. The memory 922 includes RAM and ROM, and stores a program that is executed by the processor 921, and data.

The GPS module 924 uses GPS signals received from a GPS satellite to measure a position (such as latitude, longitude, and altitude) of the car navigation device 920. The sensor 925 may include a group of sensors such as a gyro sensor, a geomagnetic sensor, and a barometric sensor. The data interface 926 is connected to, for example, an in-vehicle network 941 via a terminal that is not shown, and acquires data generated by the vehicle, such as vehicle speed data.

The content player 927 reproduces content stored in a storage medium (such as a CD and a DVD) that is inserted into the storage medium interface 928. The input device 929 includes, for example, a touch sensor configured to detect touch onto a screen of the display device 930, a button, or a switch, and receives an operation or an information input from a user. The display device 930 includes a screen such as a LCD or an OLED display, and displays an image of the navigation function or content that is reproduced. The speaker 931 outputs sounds of the navigation function or the content that is reproduced.

The wireless communication interface 933 supports any cellular communication scheme such as LET and LTE-Advanced, and performs wireless communication. The wireless communication interface 933 may typically include, for example, a BB processor 934 and an RF circuit 935. The BB processor 934 may perform, for example, encoding/decoding, modulating/demodulating, and multiplexing/demultiplexing, and performs various types of signal processing for wireless communication. Meanwhile, the RF circuit 935 may include, for example, a mixer, a filter, and an amplifier, and transmits and receives radio signals via the antenna 937. The wireless communication interface 933 may be a one chip module having the BB processor 934 and the RF circuit 935 integrated thereon. The wireless communication interface 933 may include the multiple BB processors 934 and the multiple RF circuits 935, as illustrated in FIG. 35. Although FIG. 35 illustrates the example in which the wireless communication interface 933 includes the multiple BB processors 934 and the multiple RF circuits 935, the wireless communication interface 933 may also include a single BB processor 934 or a single RF circuit 935.

Furthermore, in addition to a cellular communication scheme, the wireless communication interface 933 may support another type of wireless communication scheme such as a short-distance wireless communication scheme, a near field communication scheme, and a wireless LAN scheme. In that case, the wireless communication interface 933 may include the BB processor 934 and the RF circuit 935 for each wireless communication scheme.

Each of the antenna switches 936 switches connection destinations of the antennas 937 among multiple circuits (such as circuits for different wireless communication schemes) included in the wireless communication interface 933.

Each of the antennas 937 includes a single or multiple antenna elements (such as multiple antenna elements included in an MIMO antenna), and is used for the wireless communication interface 933 to transmit and receive radio signals. The car navigation device 920 may include the multiple antennas 937, as illustrated in FIG. 35. Although FIG. 35 illustrates the example in which the car navigation device 920 includes the multiple antennas 937, the car navigation device 920 may also include a single antenna 937.

Furthermore, the car navigation device 920 may include the antenna 937 for each wireless communication scheme. In that case, the antenna switches 936 may be omitted from the configuration of the car navigation device 920.

The battery 938 supplies power to blocks of the car navigation device 920 illustrated in FIG. 35 via feeder lines that are partially shown as dashed lines in the figure. The battery 938 accumulates power supplied form the vehicle.

In the car navigation device 920 shown in FIG. 35, one or more constituent elements included in the processing unit 140 (the information acquisition unit 141 and/or the control unit 143) described with reference to FIG. 10 may be implemented by the wireless communication interface 933. Alternatively, at least some of these constituent elements may be implemented by the processor 921. As an example, a module which includes a part (for example, the BB processor 934) or all of the wireless communication interface 933 and/or the processor 921 may be mounted in the car navigation device 920, and the one or more constituent elements may be implemented by the module. In this case, the module may store a program for causing the processor to function as the one or more constituent elements (i.e., a program for causing the processor to execute operations of the one or more constituent elements) and may execute the program. As another example, the program for causing the processor to function as the one or more constituent elements may be installed in the car navigation device 920, and the wireless communication interface 933 (for example, the BB processor 934) and/or the processor 921 may execute the program. As described above, the car navigation device 920 or the module may be provided as a device which includes the one or more constituent elements, and the program for causing the processor to function as the one or more constituent elements may be provided. In addition, a readable recording medium in which the program is recorded may be provided.

In addition, in the car navigation device 920 shown in FIG. 35, the wireless communication unit 120 described with reference to FIG. 10, for example, may be implemented by the wireless communication interface 933 (for example, the RF circuit 935). Moreover, the antenna unit 110 may be implemented by the antenna 937.

The technology of the present disclosure may also be realized as an in-vehicle system (or a vehicle) 940 including one or more blocks of the car navigation device 920, the in-vehicle network 941, and a vehicle module 942. In other words, the in-vehicle system (or a vehicle) 940 may be provided as a device which includes the one or more constituent elements included in the processing unit 140. The vehicle module 942 generates vehicle data such as vehicle speed, engine speed, and trouble information, and outputs the generated data to the in-vehicle network 941.

3. Conclusion

The use of a cell specific weighting matrix decreases the apparent number of antenna elements, decreases the scale of a baseband circuit to prevent a wireless device from costing more, and prevents increase in overhead due to a reference signal for channel estimation. Cell specific beams different in directivity widen coverage. If a channel state report includes amplitude information, a cell specific beam included in a terminal specific beam is limited and interference is decreased. Beamforming a reference signal for channel estimation can facilitate a signal high frequency for channel estimation to arrive and prevent a cell area from decreasing.

The preferred embodiment(s) of the present disclosure has/have been described above with reference to the accompanying drawings, whilst the present disclosure is not limited to the above examples. A person skilled in the art may find various alterations and modifications within the scope of the appended claims, and it should be understood that they will naturally come under the technical scope of the present disclosure.

Although the example in which the control entity and the base station are different devices has been described, for example, the present disclosure is not limited thereto. For example, the control entity may be implemented in the base station.

In addition, for example, although the example in which the communication system complies with LTE or LTE-A has been described in the embodiment of the present disclosure, the present disclosure is not limited thereto. The communication system may be, for example, a system complying with another communication standard.

Further, MIMO communication according to an embodiment of the present disclosure may be multi-user MIMO or single-user MIMO.

In addition, processing steps in processes of the present specification may not necessarily be executed in a time series manner in the order described in the flowcharts or sequence diagrams. The processing steps in the processes may also be executed in, for example, a different order from the order described in the flowcharts or sequence diagrams, or may be executed in parallel.

Furthermore, a computer program for causing a processor (e.g., a CPU, a DSP, etc.) provided in a device (e.g., the terminal device, the base station, the control entity, or a module thereof) of the present specification to function as the device (i.e., a computer program for causing the processor to execute operations of constituent elements of the above-described device) can also be created. In addition, a recording medium in which the computer program is recorded may be provided. Moreover, a device that includes a memory storing the computer program and one or more processors that can execute the computer program (e.g., a finished product or a module for a finished product (a component, a processing circuit, a chip, or the like) may also be provided. In addition, a method including operations of one or more constituent elements of the device (e.g., the information acquisition unit and/or the control unit) is also included in the technology of the present disclosure.

Further, the effects described in this specification are merely illustrative or exemplified effects, and are not limitative. That is, with or in the place of the above effects, the technology according to the present disclosure may achieve other effects that are clear to those skilled in the art from the description of this specification.

Additionally, the present technology may also be configured as below.

(1)
A wireless communication device including:
a control unit configured to output a reference signal on a first beam generated with at least two or more different first weighting matrices, generate a second weighting matrix specific to a terminal device in accordance with information transmitted from the terminal device in accordance with the reference signal, and output data for the terminal device on a second beam with the first weighting matrices and the second weighting matrix.

(2)
The wireless communication device according to (1), in which
the control unit includes amplitude information in the second weighting matrix.

(3)
The wireless communication device according to (1) or (2), including:
an array-type antenna including sub arrays and transceiver units, in which
each of the transceiver units transmits the reference signal.

(4)
The wireless communication device according to (3), in which
the one sub array is connected to the one or more transceiver units.

(5)
The wireless communication device according to any one of (1) to (4), in which
the control unit selects the first beam included in the second beam on the basis of information acquired by the acquisition unit.

(6)
The wireless communication device according to any one of (1) to (5), in which
the control unit notifies the terminal device in accordance with the reference signal whether to include amplitude information in information to be transmitted from the terminal device.

(7)
The wireless communication device according to any one of (1) to (6), in which
the control unit notifies the terminal device of configuration information of the first beam included in the second beam.

(5)
The wireless communication device according to (7), in which
the control unit issues a notification of information of an antenna port of the first beam included in the second beam as the configuration information of the first beam.

(9)
The wireless communication device according to (7), in which
the control unit issues a notification of information on the second weighting matrix as the configuration information of the first beam.

(10)
The wireless communication device according to (7), in which
the control unit multiplies the second weighting matrix by a reference signal for channel estimation for each first beam on a resource block in which a data channel is assigned to the terminal device.

(11)
The wireless communication device according to (7), in which
the control unit multiplies the second weighting matrix by a decoding reference signal for each first beam on a resource block in which a data channel is assigned to the terminal device.

(12)

The wireless communication device according to any one of (7) to (11), in which the control unit notifies the terminal device of the configuration information of the first beam with downlink control information (DCI).

(13)

A wireless communication device including:

a control unit configured to output a reference signal on a beam generated with at least two or more different weighting matrices, decide timing of outputting data for a terminal device on the beam in accordance with information transmitted from the terminal device in accordance with the reference signal, and output the data for the terminal device at the decided timing.

(14)

The wireless communication device according to (13), in which the control unit assigns a data channel to the beams on a resource block level or a resource element level.

(15)

The wireless communication device according to (13) or (14), in which the control unit notifies the terminal device of an antenna port different from an antenna port for transmitting the beam as an antenna port for transmitting a data channel.

(16)

The wireless communication device according to any one of (13) to (15), including:

an array-type antenna including sub arrays and transceiver units, in which each of the transceiver units transmits the reference signal.

(17)

The wireless communication device according to (16), in which the one sub array is connected to the one or more transceiver units.

(18)

A terminal device including:

a control unit configured to measure reference signals transmitted on beams from a wireless communication device, and generate a channel state report on the basis of an instruction from the wireless communication device, the channel state report reporting a channel state of each beam to the wireless communication device, the instruction being included in the beam.

(19)

The terminal device according to (18), in which the control unit includes information of reception strength for each of the reference signals in the channel state report.

(20)

The terminal device according to (18) or (19), in which the acquisition unit receives a beam specific to the terminal device and cell specific beam configuration information from the wireless communication device, and separates and receives the beam specific to the terminal device for each cell specific beam on the basis of the cell specific beam configuration information.

(21)

A method including:

outputting a reference signal on a first beam generated with at least two or more different first weighting matrices; and generating a second weighting matrix specific to a terminal device on the basis of information acquired from the terminal device in accordance with the reference signal, and outputting data for the terminal device on a second beam generated with the first weighting matrices and the second weighting matrix.

(22)

A method including:

outputting a reference signal on a beam generated with at least two or more different weighting matrices; and deciding timing of outputting data for a terminal device on the beam on the basis of information acquired from the terminal device in accordance with the reference signal, and outputting the data for the terminal device at the decided timing.

(23)

A method including:

measuring reference signals transmitted from a wireless communication device on beams corresponding to a terminal device;

generating a channel state report on the basis of an instruction from the wireless communication device, the channel state report reporting a channel state of each beam; and receiving a beam generated by the wireless communication device on the basis of the channel state report.

(24)

A computer program causing a computer to execute:

outputting a reference signal on a first beam generated with at least two or more different first weighting matrices; and generating a second weighting matrix specific to a terminal device on the basis of information acquired from the terminal device in accordance with the reference signal, and outputting data for the terminal device on a second beam generated with the first weighting matrices and the second weighting matrix.

(25)

A computer program causing a computer to execute:

outputting a reference signal on a beam generated with at least two or more different weighting matrices; and deciding timing of outputting data for a terminal device on the beam on the basis of information acquired from the terminal device in accordance with the reference signal, and outputting the data for the terminal device at the decided timing.

(26)

A computer program causing a computer to execute:

measuring reference signals transmitted from a wireless communication device on beams corresponding to a terminal device;

generating a channel state report on the basis of an instruction from the wireless communication device, the channel state report reporting a channel state of each beam; and receiving a beam generated by the wireless communication device on the basis of the channel state report.

REFERENCE SIGNS LIST 1 communication system
100a, 100b terminal device
200 base station
300 control entity

The invention claimed is:

1. A wireless communication device comprising:
circuitry configured to
output a reference signal on a first beam generated with at least two or more different cell specific first weighting matrices, generate a terminal specific second weighting matrix specific to a terminal device in accordance with information transmitted from the terminal device in accordance with the reference signal, combine the cell specific first weighting matrices with the terminal specific second weighting matrix to generate a terminal specific second beam, output data for the terminal device on the terminal specific second beam simultaneously including both the cell specific first weighting matrices and the terminal specific second weighting matrix, and transmit the terminal specific second beam with one antenna port;

wherein the wireless communication device further comprises an array-type antenna including sub arrays and transceiver units, wherein each of the transceiver units transmits the reference signal;

wherein the circuitry notifies the terminal device of configuration information of the first beam included in the second beam; and wherein the circuitry notifies the terminal device of the configuration information of the first beam with downlink control information (DCI).

2. The wireless communication device according to claim 1, wherein
the circuitry includes amplitude information in the second weighting matrix.

3. The wireless communication device according to claim 1, wherein
the one sub array is connected to the one or more transceiver units.

4. The wireless communication device according to claim 1, wherein
the circuitry selects the first beam included in the second beam on the basis of acquired information.

5. The wireless communication device according to claim 1, wherein
the circuitry notifies the terminal device in accordance with the reference signal whether to include amplitude information in information to be transmitted from the terminal device.

6. The wireless communication device according to claim 1, wherein
the circuitry issues a notification of information of an antenna port of the first beam included in the second beam as the configuration information of the first beam.

7. A wireless communication device comprising:
circuitry configured to
output a reference signal on a beam generated with at least two or more different cell specific weighting matrices,
decide timing of outputting data for a terminal device on the beam in accordance with information transmitted from the terminal device in accordance with the reference signal,
generate a terminal specific second weighting matrix specific to the terminal device in accordance with information transmitted from the terminal device in accordance with the reference signal,
combine the cell specific first weighting matrices with the terminal specific second weighting matrix to generate a terminal specific second beam,
output data for the terminal device on a second beam simultaneously including both the first weighting matrices and the terminal specific second weighting matrix, and
output the data for the terminal device at the decided timing;
wherein the wireless communication device further comprises an array-type antenna including sub arrays and transceiver units, wherein each of the transceiver units transmits the reference signal;
wherein the circuitry notifies the terminal device of configuration information of the first beam included in the second beam; and
wherein the circuitry notifies the terminal device of the configuration information of the first beam with downlink control information (DCI).

8. The wireless communication device according to claim 7, wherein
the circuitry assigns a data channel to the beams on a resource block level or a resource element level.

9. The wireless communication device according to claim 7, wherein
the circuitry notifies the terminal device of an antenna port different from an antenna port for transmitting the beam as an antenna port for transmitting a data channel.

10. The wireless communication device according to claim 7, wherein
the one sub array is connected to the one or more transceiver units.

11. A terminal device comprising:
circuitry configured to
measure reference signals transmitted on beams from a wireless communication device,
generate a channel state report on the basis of an instruction from the wireless communication device, the channel state report reporting a channel state of each beam to the wireless communication device, the instruction being included in the beam, and
receive data from a terminal specific second beam, the terminal specific second beam simultaneously including both cell specific first weighting matrices and a terminal specific second weighting matrix which is based upon the channel state report;
wherein the wireless communication device includes an array-type antenna including sub arrays and transceiver units, wherein each of the transceiver units transmits the reference signal;
wherein the wireless communication device notifies the terminal device of configuration information of the first beam included in the second beam; and
wherein the wireless communication device notifies the terminal device of the configuration information of the first beam with downlink control information (DCI).

12. The terminal device according to claim 11, wherein
the circuitry includes information of reception strength for each of the reference signals in the channel state report.

* * * * *